US012327435B2

(12) United States Patent
Partyshev et al.

(10) Patent No.: US 12,327,435 B2
(45) Date of Patent: Jun. 10, 2025

(54) # SYSTEMS AND METHODS FOR VALIDATING AND SUBSEQUENTLY THERMALLY OBFUSCATING A PAPER TICKET USED TO ACCESS AN ELECTRONIC VOTING DEVICE

(71) Applicant: Hart InterCivic, Inc., Austin, TX (US)

(72) Inventors: Viktor Partyshev, Round Rock, TX (US); James M. Canter, Austin, TX (US)

(73) Assignee: Hart InterCivic, Inc., Austin, TX (US)

( * ) Notice: Subject to any disclaimer, the term of this patent is extended or adjusted under 35 U.S.C. 154(b) by 82 days.

(21) Appl. No.: 18/377,150

(22) Filed: Oct. 5, 2023

(65) Prior Publication Data

US 2025/0069460 A1 Feb. 27, 2025

Related U.S. Application Data

(60) Provisional application No. 63/533,739, filed on Aug. 21, 2023.

(51) Int. Cl.
*G07C 13/00* (2006.01)

(52) U.S. Cl.
CPC .................................... *G07C 13/00* (2013.01)

(58) Field of Classification Search
CPC ..................................................... G07C 13/00
See application file for complete search history.

(56) References Cited

U.S. PATENT DOCUMENTS

| | | | | |
|---|---|---|---|---|
| 6,269,169 | B1 | 7/2001 | Funk et al. | |
| 7,111,782 | B2 | 9/2006 | Homewood et al. | |
| 8,191,764 | B2 | 6/2012 | Bolton | |
| 11,282,323 | B2 | 3/2022 | Van Horn et al. | |
| 2004/0016803 | A1* | 1/2004 | Cummings | G07C 13/00 235/386 |
| 2007/0095909 | A1* | 5/2007 | Chaum | G07C 13/00 235/386 |
| 2012/0145784 | A1 | 6/2012 | Coomer et al. | |
| 2014/0168332 | A1* | 6/2014 | Wilsher | B41J 2/2107 347/100 |
| 2022/0406116 | A1 | 12/2022 | Dandurand et al. | |

FOREIGN PATENT DOCUMENTS

| | | |
|---|---|---|
| BR | PI0903258 | 11/2010 |
| KR | 101031335 | 4/2011 |

* cited by examiner

*Primary Examiner* — Jamara A Franklin
(74) *Attorney, Agent, or Firm* — Egan, Enders & Huston LLP.

(57) ABSTRACT

Embodiments of systems and methods are provided to enable voters to access an electronic voting device and activate a corresponding ballot style without manual poll worker intervention or communicating information across a network. More specifically, an improved electronic voting device is provided having a ticket reader for validating a paper ticket inserted into the ticket reader, and subsequently voiding the paper ticket after successful validation. The ticket reader disclosed herein may utilize a wide variety of methods to validate and void the paper ticket inserted into the ticket reader.

20 Claims, 12 Drawing Sheets

SYSTEMS AND METHODS FOR VALIDATING AND SUBSEQUENTLY THERMALLY OBFUSCATING A PAPER TICKET USED TO ACCESS AN ELECTRONIC VOTING DEVICE

This application claims priority to U.S. Provisional Patent Application No. 63/533,739 entitled Systems and Methods for Validating and Subsequently Voiding a Paper Ticket Used to Access an Electronic Voting Device, filed Aug. 21, 2023, the disclosure of which is expressly incorporated by reference in its entirety.

BACKGROUND OF THE INVENTION

The present disclosure relates to systems and methods for gaining access to an electronic voting device. More specifically, the present disclosure relates to systems and methods that utilize a paper ticket to gain access to an electronic voting device.

A wide variety of voting systems and processes are commonly used in federal, state, county and local elections. In some cases, a voter may utilize an electronic voting device located at a voting precinct or an official polling location to access an electronic ballot and specify their voting preferences. Electronic voting devices typically include a display screen for displaying voting information to the voter. Examples of voting information that may be displayed on the display screen include electronic ballots, instructions for utilizing electronic ballots, summaries of voting selections made by the voter on an electronic ballot, etc. In addition, the display screen may display various graphical user interface (GUI) components, which enable a voter to enter information, navigate through an electronic ballot, make voting selections on the electronic ballot and cast their vote once voting selections are reviewed and confirmed.

Examples of electronic voting devices used by voters include ballot marking devices (BMDs), voting terminals, voter interface devices, accessibility interfaces, voter-verified paper trail devices, scanning devices, direct recording electronic (DRE) devices, hybrid paper/electronic voting devices, and a wide range of other devices used to present and/or input voting information to and/or from a voter. These electronic voting devices are typically deployed within a voting precinct or an official polling location in groups. The electronic voting devices deployed at polling locations may be independent, stand-alone devices or connected via a network to a centralized server (or centralized controller).

A variety of methods are currently used to provide voter access to an electronic voting system and to select a particular ballot style corresponding to the current election and the voter's precinct. For example, an election official or poll worker can provide voter access to an electronic voting device by manually entering a poll worker access code into the electronic voting device followed by selection of the voter's precinct to activate the corresponding ballot style. This manual voter access and ballot activation method can be used to access both standalone and network connected electronic voting devices, but requires poll worker intervention.

Alternatively, voter access and ballot style selection can be controlled by a centralized controller when the electronic voting devices are connected via a network in a centralized network model. For example, the centralized controller (or another networked device) can print an access code ticket, which is provided to the voter and used to gain access to a networked electronic voting device. The access code ticket (otherwise referred to as a ballot activation ticket) may have a code (such as, for example, an alphanumeric code) printed thereon. The voter may enter the code into the electronic voting device to gain access to the electronic voting device and/or select a particular ballot style corresponding to the voter's precinct.

In the centralized network model, the code entered by the voter can be verified or validated against a corresponding code stored within the centralized controller that issued the access code ticket. While this method provides secure voter access and ballot activation in a centralized network model, this method cannot be used in a non-networked topology in which the device issuing the access code ticket is disconnected from the electronic voting devices used for voting.

A need, therefore, exists for improved systems and methods that enable voters to access an electronic voting device and activate a corresponding ballot style without manual poll worker intervention or communicating information across a network.

SUMMARY OF THE INVENTION

The present disclosure provides various embodiments of systems and methods that enable voters to access an electronic voting device and activate a corresponding ballot style without manual poll worker intervention or communicating information across a network. More specifically, the present disclosure provides an improved ticket reader for validating a paper ticket inserted into the ticket reader, and subsequently voiding the paper ticket after successful validation. The ticket reader, which may be built-in or communicatively coupled to an electronic voting device, may utilize a wide variety of methods to validate a paper ticket used to access the electronic voting device. Unlike conventional systems and methods, which require poll worker intervention or communicating information across a network, the validation methods disclosed herein are performed entirely within the ticket reader.

The paper ticket described herein has encoded data printed thereon, which can be used to access an electronic voting device and/or select a ballot style corresponding to the voter's precinct. In some embodiments, the paper ticket may be an access code ticket or a ballot activation ticket, which is printed by another device (for example, a ballot activation unit (BAU)) and provided to a voter. Upon detecting insertion of a paper ticket, the ticket reader disclosed herein may use various methods of validation to verify that the paper ticket inserted into the ticket reader is original (i.e., not a copy) and trusted (i.e., came from a trusted source). After successfully validating a paper ticket, the ticket reader voids the paper ticket to ensure that the paper ticket cannot be reused (i.e., single use).

In some embodiments, the ticket reader disclosed herein may use a variety of methods for validating and voiding a paper ticket, which is printed on thermal paper. For example, the ticket reader may attempt to validate a paper ticket by determining whether a thermal marking can be produced on the paper ticket and/or by comparing reflectance values obtained from the paper ticket to known values of reflectance for thermal paper. In some embodiments, the ticket reader may validate the paper ticket if: (a) a thermal marking is produced on the paper ticket and detected by the ticket reader, and/or (b) the reflectance values measured from the paper ticket and detected by the ticket reader fall within a range of reflectance values corresponding to thermal paper.

Other validation methods may additionally or alternatively be used by the ticket reader to validate a paper ticket inserted into the ticket reader. For example, the ticket reader may attempt to validate a paper ticket by determining whether an invisible ink (for example, ink that is invisible to the human eye under visible light conditions and visible under ultra-violet (UV) ink (or "invisible ink" infrared (IR) light conditions) marking provided on or embedded within the thermal paper is detected on the paper ticket.

Upon successfully validating a paper ticket, the ticket reader disclosed herein may use the encoded data printed on the paper ticket to enable voter access to the electronic voting device and/or select a ballot style corresponding to the voter's precinct. Before returning the validated paper ticket to the voter, however, the ticket reader disclosed herein may obfuscate the encoded data printed on the paper ticket to void the paper ticket and prevent the paper ticket from being reused. In some embodiments, the ticket reader may use a thermal heating element, which is provided within the ticket reader and positioned adjacent to the paper ticket, to thermally obfuscate at least a portion of the encoded data printed on the paper ticket after successful validation of the paper ticket.

According to one embodiment, an electronic voting device is provided herein with a paper slot that is configured to receive a paper ticket having encoded data printed on a first side of the paper ticket, such as a QR code, a barcode or another machine-readable code. In some embodiments, the paper ticket may include, or be printed on, thermal paper. The electronic voting device disclosed herein may further include at least one light source coupled to provide illumination to the paper ticket, at least one optical sensor coupled to detect illumination that passes through, or is reflected from, the paper ticket, and a thermal heating element that is positioned adjacent to the paper ticket. In some embodiments, the at least one programmable integrated circuit (IC) may be configured to execute program instructions to attempt to validate the paper ticket based, at least in part, on the illumination detected by the at least one optical sensor. Upon validating the paper ticket, the at least one programmable IC may be further configured to execute the program instructions to activate the thermal heating element to obfuscate the encoded data printed on the first side of the paper ticket and void the paper ticket.

After the paper ticket is validated, the at least one programmable IC may be further configured to execute the program instructions to use the encoded data to perform at least one of the following: (a) enable or disable user access to the electronic voting device, and (b) select a ballot style if the user access to the electronic voting device is enabled. Activating the thermal heating element to obfuscate the encoded data printed on the first side of the paper ticket provides the advantage of preventing the paper ticket from being reused.

The thermal heating element provided within the electronic voting device may be implemented in a wide variety of ways. In some embodiments, for example, the thermal heating element may include a printed circuit board having conductive traces printed thereon, a ceramic substrate based heating element or a metal substrate based heating element. The conductive components of the thermal heating element (for example, the conductive traces printed on the printed circuit board, the ceramic substrate based heating element or the metal substrate based heating element) may form a word, a letter, a shape or a symbol. Upon activating the thermal heating element, current is supplied to the conductive components of the thermal heating element to generate an amount of heat that is sufficient to activate the thermal paper and thermally obfuscate at least a portion of the encoded data printed on the first side of the paper ticket.

The at least one light source and the at least one optical sensor may also be implemented in a wide variety of ways. In some embodiments, the at least one light source may include a white light source providing illumination in the visible light spectrum (for example, 400-700 nm). In some embodiments, the at least one light source may include an ultra-violet (UV) light source providing illumination in the UV light spectrum (for example, 200-400 nm) and/or an infrared (IR) light source providing illumination in the IR light spectrum (for example, 700 nm-1 mm). In some embodiments, the at least one optical sensor may include a photodetector, a photodiode array or an image sensor. In one example embodiment, the at least one optical sensor may be a camera having an image sensor and a lens.

The at least one programmable IC may attempt to validate the paper ticket in a wide variety of ways. In some embodiments, the at least one programmable IC may attempt to validate the paper ticket based on reflectance values obtained from the thermal paper. For example, the at least one programmable IC may execute the program instructions to: generate a digital value corresponding to an amount of the illumination that is reflected from the paper ticket and detected by the at least one optical sensor; validate the paper ticket if the digital value falls within a range of digital values corresponding to thermal paper; and invalidate the paper ticket if the digital value does not fall within the range of digital values corresponding to thermal paper. In some embodiments, the at least one light source may be a first light source (for example, a white light source), and the range of digital values may correspond to a range of reflectance values obtained from thermal paper illuminated with light in the visible light spectrum. In other embodiments, the at least one light source may be a second light source (for example, a UV or IR light source), and the range of digital values correspond to a range of reflectance values obtained from thermal paper illuminated with light in the infrared (IR) or ultra-violet (UV) light spectrum.

In other embodiments, the at least one programmable IC may attempt to validate the paper ticket based on the presence or absence of an invisible ink marking on the paper ticket. In such embodiments, the at least one light source may include an ultra-violet (UV) light source for illuminating the paper ticket with light in the UV light spectrum or an infrared (IR) light source for illuminating the paper ticket with light in the IR light spectrum.

When attempting to validate the paper ticket based on the presence or absence of an invisible ink marking on the paper ticket, the at least one programmable IC may execute the program instructions to obtain an image of the first side of the paper ticket from the at least one optical sensor, and analyze the image to determine the presence or absence of an invisible ink marking on the paper ticket. In some embodiments, the image may be obtained from an image frame or a video stream, which is captured by the at least one optical sensor while the paper ticket is illuminated with light in the UV light spectrum or the IR light spectrum. Based on the image analysis, the program instructions executed by the at least one programmable IC may validate the paper ticket if the invisible ink marking is detected on the paper ticket, or invalidate the paper ticket if the invisible marking is not detected on the paper ticket.

In other embodiments, the at least one programmable IC may attempt to validate the paper ticket based on the ability or inability to produce a thermal mark on the paper ticket. In such embodiments, the at least one light source may include a white light source for illuminating the paper ticket with light in the visible light spectrum.

When attempting to validate the paper ticket based on the ability or inability to produce a thermal mark on the paper ticket, the at least one programmable IC may execute the program instructions to obtain a first image of the first side of the paper ticket from the at least one optical sensor, activate the thermal heating element to attempt to thermally mark the paper ticket, obtain a second image of the first side of the paper ticket from the at least one optical sensor, and compare the second image to the first image. In some embodiments, the first image may be obtained from a first image frame or a first video stream, and the second image may be obtained from a second image frame or a second video stream, which is captured by the at least one optical sensor while the paper ticket is illuminated with light in the visible light spectrum. Based on the image comparison, the program instructions executed by the at least one programmable IC may validate the paper ticket if the comparison shows a thermal mark is produced on the paper ticket by the thermal heating element, or invalidate the paper ticket if the comparison shows a thermal mark is not produced on the paper ticket by the thermal heating element.

In some embodiments, the electronic voting device may be a stand-alone device, which is not connected to a network. In such an embodiment, the at least one programmable IC may be configured to execute the program instructions to validate the paper ticket automatically without poll worker intervention or communicating information across a network. In other embodiments, the electronic voting device may be connected to a centralized controller via a network. Regardless of network topology, the electronic voting device set forth above and described further herein may utilize the various embodiments disclosed herein to provide secure voter access and ballot activation.

According to another embodiment, a method is provided herein for validating and subsequently voiding a paper ticket used to access an electronic voting device. In some embodiments, the method may generally include receiving a paper ticket having encoded data printed on a first side of the paper ticket, providing illumination to the paper ticket, detecting illumination reflected from the paper ticket and attempting to validate the paper ticket based, at least in part, on the illumination detected from the paper ticket. Upon validating the paper ticket, the method may further include using the encoded data printed on the first side of the paper ticket to perform at least one of the following: (a) enable or disable user access to the electronic voting device, and (b) select a ballot style if the user access to the electronic voting device is enabled; and thermally obfuscating at least a portion of the encoded data printed on the first side of the paper ticket to void the paper ticket and prevent the paper ticket from being reused.

In some embodiments, the paper ticket may include thermal paper, and the encoded data may be thermally obfuscated by generating a thermal mark over at least a portion of the encoded data. In such embodiments, the thermal mark may include a word, a letter, a shape or a symbol.

In some embodiments, the paper ticket may include thermal paper, and the electronic voting device may include a thermal heating element positioned adjacent to the paper ticket. In such embodiments, the encoded data may be thermally obfuscated by supplying current to the thermal heating element to generate an amount of heat that is sufficient to activate the thermal paper and thermally obfuscate the encoded data printed on the first side of the paper ticket.

The method may attempt to validate the paper ticket in a wide variety of ways. In some embodiments, the method may attempt to validate the paper ticket based on reflectance values obtained from the paper ticket. For example, the method may attempt to validate the paper ticket by: generating a digital value corresponding to an amount of the illumination that is reflected from the paper ticket; validating the paper ticket if the digital value falls within a range of digital values corresponding to thermal paper; and invalidating the paper ticket if the digital value does not fall within the range of digital values corresponding to thermal paper.

In other embodiments, the method may attempt to validate the paper ticket based on the presence or absence of an invisible ink marking on the paper ticket. For example, the method may attempt to validate the paper ticket by: obtaining an image of the first side of the paper ticket, wherein the image is captured while the paper ticket is illuminated with UV illumination or IR illumination; analyzing the image to determine the presence or absence of an invisible ink marking on the paper ticket; validating the paper ticket if the invisible ink marking is detected on the paper ticket; and invalidating the paper ticket if the invisible ink marking is not detected on the paper ticket.

In other embodiments, the method may attempt to validate the paper ticket based on the ability or inability to produce a thermal mark on the paper ticket. For example, the method may attempt to validate the paper ticket by: obtaining a first image of the first side of the paper ticket; activating a thermal heating element positioned adjacent to a second side of the paper ticket to attempt to thermally mark the paper ticket; obtaining a second image of the first side of the paper ticket; comparing the second image to the first image; validating the paper ticket if the comparison shows a thermal mark is produced on the paper ticket by the thermal heating element; and invalidating the paper ticket if the comparison shows a thermal mark is not produced on the paper ticket by the thermal heating element.

Various embodiments of electronic voting devices and methods are provided herein for enabling secure voter access to an electronic voting device, and more specifically, for validating and subsequently voiding a paper ticket used to securely access an electronic voting device. Of course, the order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section does not specify every embodiment and/or incrementally novel aspect of the present disclosure or claimed inventions. Instead, this summary only provides a preliminary discussion of different embodiments and corresponding points of novelty over conventional techniques. For additional details and/or possible perspectives of the invention and embodiments, the reader is directed to the Description of the Preferred Embodiments section and corresponding figures of the present disclosure as further discussed below.

BRIEF DESCRIPTION OF THE DRAWINGS

A more complete understanding of the present invention and advantages thereof may be acquired by referring to the following description taken in conjunction with the accompanying drawings, in which like reference numbers indicate like features. It is to be noted, however, that the accompanying drawings illustrate only exemplary embodiments of the disclosed concept and are therefore not to be considered limiting of its scope, for the disclosed concept may admit to other equally effective embodiments.

DESCRIPTION OF THE PREFERRED EMBODIMENTS

Figure 1:
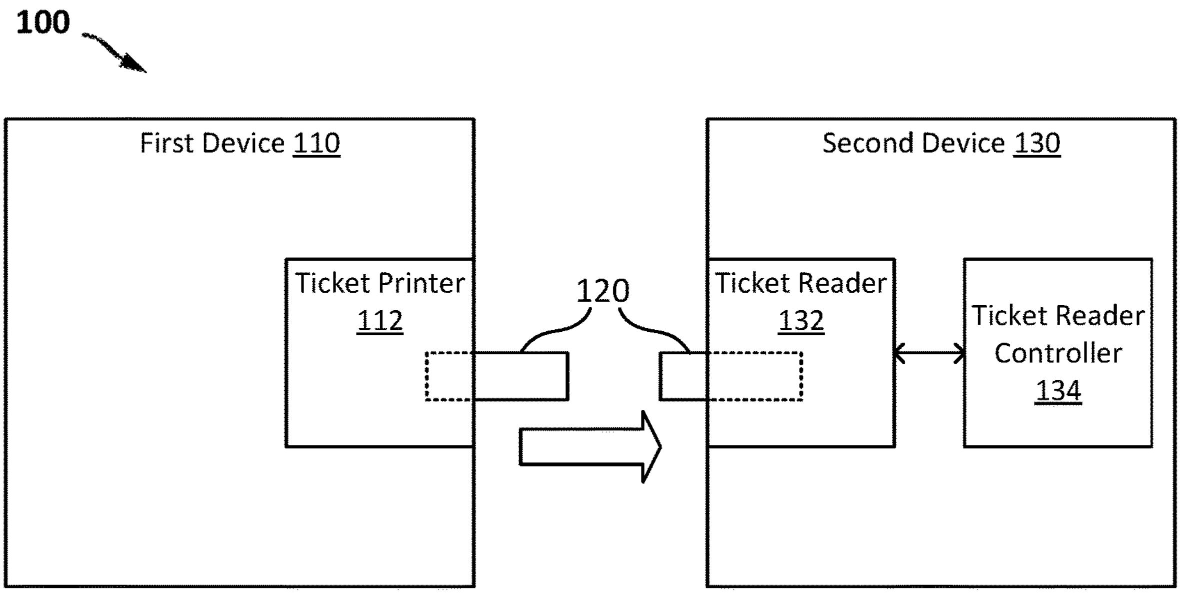
FIG. 1 is a block diagram illustrating one embodiment of a system in accordance with the present disclosure, the system comprising a first device having a ticket printer and a second device having a ticket reader and a ticket reader controller.

Turning now to the drawings, FIG. 1 illustrates one embodiment of a system 100 that enables voters to access an electronic voting device and activate a corresponding ballot style without manual poll worker intervention or communicating information across a network. As shown in FIG. 1, the system 100 includes a first device 110 configured to print a paper ticket 120 and a second device 130 configured to receive the paper ticket 120 printed by the first device 110. In some embodiments, the first device 110 is a ballot activation unit (BAU) or another device, which is configured to print a paper ticket 120 (for example, an access code ticket or ballot activation ticket) that can be used to access the second device 130 and/or to activate a particular ballot style used for voting on the second device 130. In some embodiments, the second device 130 may be an electronic voting device, such as a ballot marking device (BMD) or another device used for voting.

In addition to other components, the first device 110 includes a ticket printer 112 for generating a paper ticket 120. In some embodiments, ticket printer 112 may generate the paper ticket 120 by printing information on thermal paper. The thermal paper can be provided within the ticket printer 112 as a roll or individually cut sheets. In some embodiments, the thermal paper may have a thermal coating on only one side of the paper and a non-coated side on the other. In other embodiments, both sides of the thermal paper may have a thermal coating. Conventional thermal paper has a chemical coating on at least one side that changes color in an area where sufficient heat is applied to the thermal paper. Often the chemical coating is selected to turn black when sufficiently heated, but any color can be used in the practice.

After a paper ticket 120 is generated by the ticket printer 112 and handed to the voter, the voter may attempt to access the second device 130 by inserting the paper ticket 120 into a ticket reader 132, which is built-in or communicatively coupled to the second device 130. The second device 130 may be an electronic voting device (for example, a ballot marking device (BMD), a voting terminal, a voter interface device, an accessibility interface, a voter-verified paper trail device, a ballot scanning device, a direct recording electronic (DRE) device, a hybrid paper/electronic voting device, etc.), which is used by the voter to enter voter information and voting selections. In addition to gaining access to the electronic voting device, the paper ticket 120 inserted into the ticket reader 132 may be used to select a particular ballot style to be used by the voter for voting on the electronic voting device.

In addition to other components, the second device 130 includes a ticket reader 132 for receiving, validating and voiding the paper ticket 120, and a ticket reader controller 134 for controlling operations of the ticket reader 132 and determining the validity of the paper ticket 120. As described in more detail below, the ticket reader 132 validates the paper ticket 120 for authenticity and originality, and ensures that it has not been used before. Once validated, the ticket reader 132 voids the paper ticket 120 (to ensure that it cannot be used again) before the paper ticket 120 is retrieved by the voter and/or discarded.

In the embodiment shown in FIG. 1, The first device 110 and the second device 130 are standalone devices, which are not connected to a centralized controller via a network. In the illustrated embodiment, the ticket reader 132 and ticket reader controller 134 included within the second device 130 function to provide secure voter access and ballot activation in a non-networked topology. However, the secure voter access and ballot activation techniques disclosed herein are not strictly limited to use within standalone devices. In other embodiments (not shown), the techniques disclosed herein may be used to provide secure voter access and ballot activation in a centralized network model, in which at least the second device 130 is connected to a centralized controller via a network.

Figure 2A:
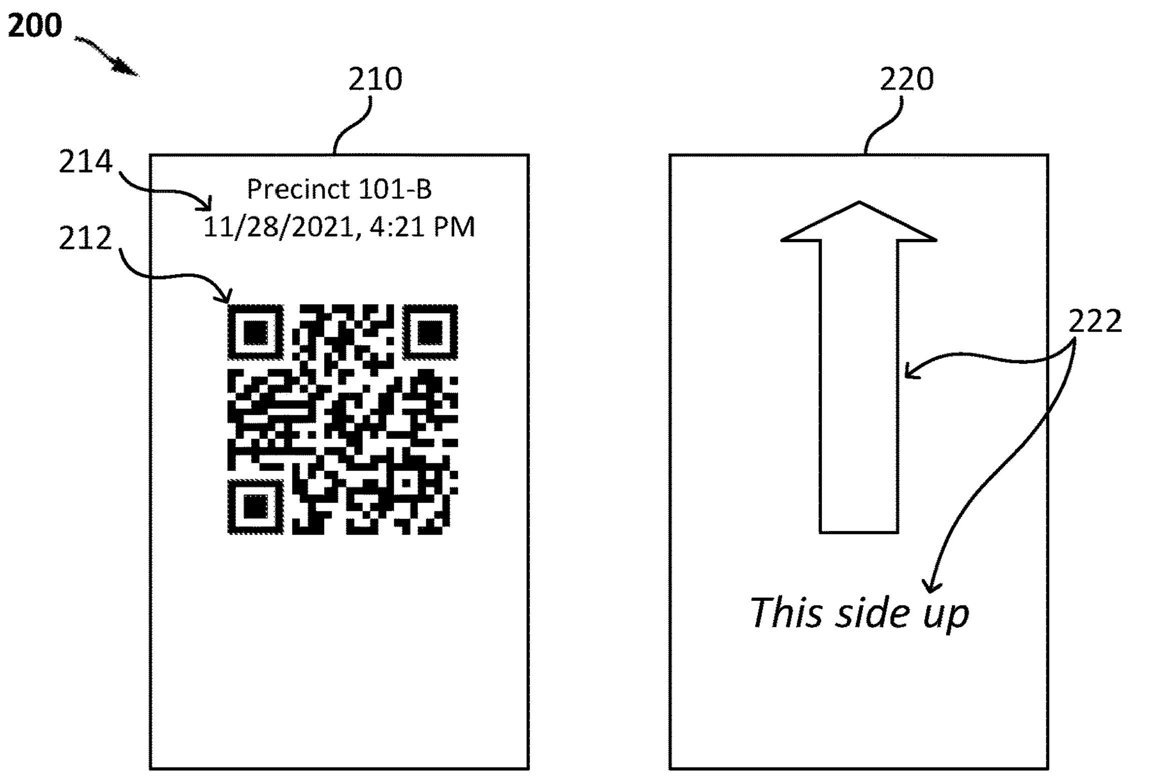
FIG. 2A illustrates one example of a paper ticket.
Figure 2B:
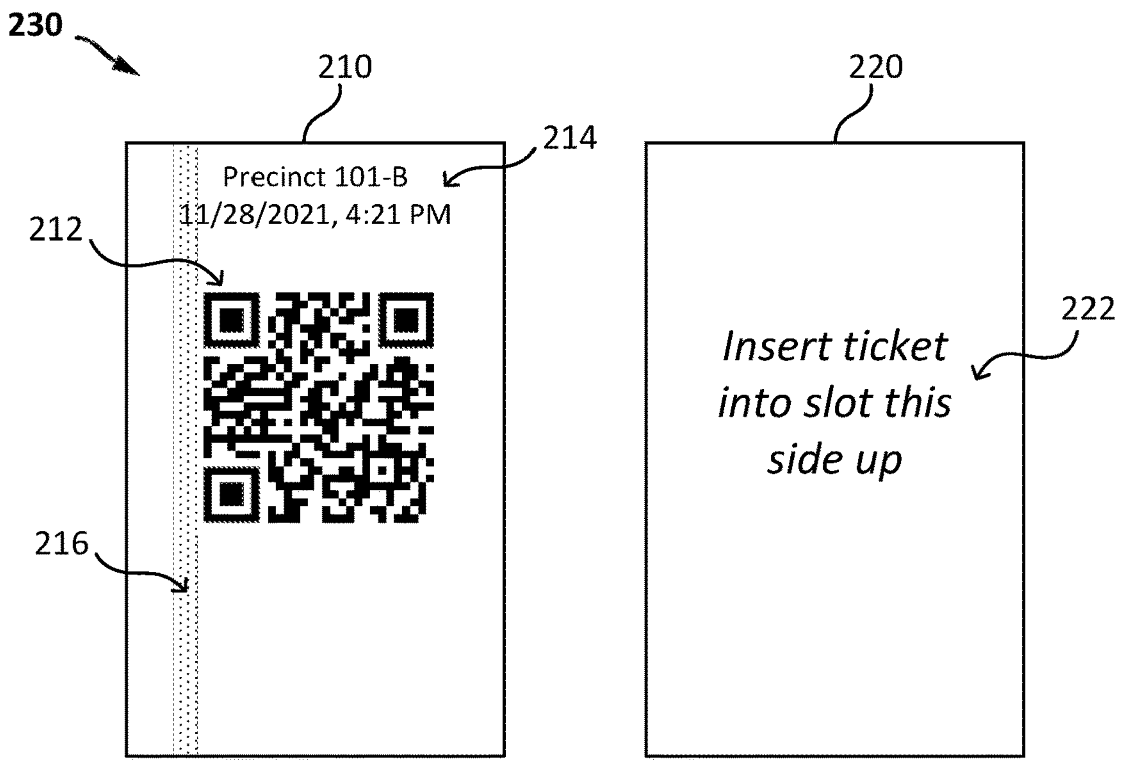
FIG. 2B illustrates another example of a paper ticket.

A wide variety of information may be printed on the paper ticket 120. For example, the paper ticket 120 generated by the ticket printer 112 may have encoded data printed on one side, and instructions for the voter (and/or the poll worker) printed on the other side of the paper ticket 120. FIGS. 2A and 2B illustrate examples of information that can be printed on the paper ticket 120 by the ticket printer 112. It is noted that the examples shown in FIGS. 2A and 2B are provided for explanatory purposes only and the techniques described herein are not strictly limited to only those examples.

FIG. 2A illustrates one embodiment of a paper ticket 200 that can be generated by the ticket printer 112. As shown in FIG. 2A, paper ticket 200 includes a first side 210 (for example, a thermally coated side) and a second side 220 (for example, a non-coated side). The first side 210 of the paper ticket 200 has encoded data 212 and (optionally) metadata 214 printed thereon. The second side 220 of the paper ticket 200 has instructions 222 (for example, "This side up") that a voter can use to properly insert the paper ticket 220 into a ticket reader (for example, ticket reader 132 in FIG. 1) built-in or communicatively coupled to the second device 130.

When a voter checks in at a polling location and is assigned a specific ballot style (based on jurisdictional provided processes), a poll worker enters the assigned ballot style into the first device 110. The first device 110 uses the ballot style entered by the poll worker and possibly other data (such as, for example, a username of the voter, a digital signature of the username, an election identification (ID) and/or a voter-specific nonce) to generate the encoded data 212, which is printed onto the first side 210 of the paper ticket 200. In some embodiments, the encoded data 212 may be printed onto the first side 210 of the paper ticket 200 as a QR code (as shown in FIG. 2A), a barcode (not shown) or any other suitable machine-readable code. Unlike conventional methods, which print a human-readable access code onto the paper ticket, the encoded data 212 printed on the paper ticket 200 provides tamper resistance and non-repudiation of the paper ticket 200. In some embodiments, metadata 214 associated with the ticket instance (such as, for example, the voting precinct, as well as the date and time of ticket generation) may also be printed on the first side 210 of the paper ticket 200, as shown in FIG. 2A.

FIG. 2B illustrates another embodiment of a paper ticket 230 that can be generated by the ticket printer 112. Like the embodiment shown in FIG. 2A, the paper ticket 230 includes a first side 210 (for example, a thermally coated side) having encoded data 212 and metadata 214 printed thereon, and a second side 220 (for example, a non-coated side) having printed instructions 222 (for example, "Insert ticket into slot this side up"). Unlike the embodiment shown in FIG. 2A, the paper ticket 230 shown in FIG. 2B is printed on thermal paper having invisible ink (for example, ink that is invisible to the human eye under visible light conditions and visible under ultra-violet (UV) or infrared (IR) light conditions) embedded with the thermal paper or printed thereon. In the embodiment shown in FIG. 2B, an invisible ink marking 216 in the form of a UV/IR ink strip is provided on the first side 210 of the paper ticket 230. Other invisible ink markings may also be provided on the first side 210 of the paper ticket 230. In some embodiments, the invisible ink marking 216 may be used, along with the encoded data 212 printed on the first side 210 of the paper ticket 230, to provide tamper resistance and non-repudiation of the paper ticket 230.

Figure 3:
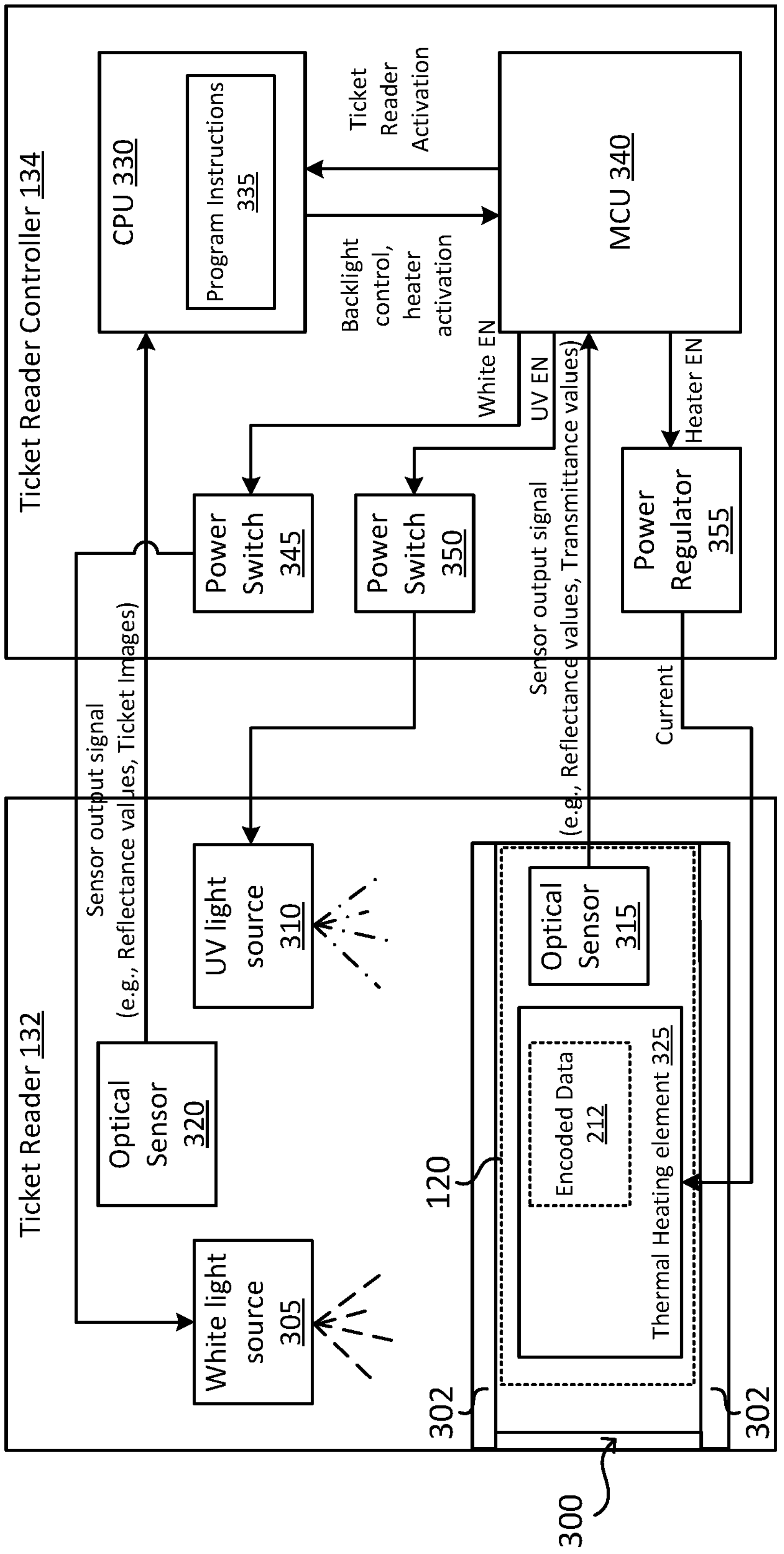
FIG. 3 is a block diagram illustrating example hardware components included within a ticket reader and ticket reader controller in accordance with one embodiment of the present disclosure.

FIG. 3 provides a block diagram of example hardware components that may be included within the ticket reader 132 and ticket reader controller 134 in accordance with one embodiment of the present disclosure. As shown in FIG. 3, the ticket reader 132 includes a paper slot 300 for receiving a paper ticket 120 and a paper channel 302 for guiding the paper ticket 120 into an enclosed chamber of the ticket reader 132. The ticket reader 132 further includes: (a) at least one light source coupled to provide illumination to the first side of the paper ticket 120, (b) at least one optical sensor (for example, a photodetector, a photodiode array or an image sensor) coupled to detect illumination that passes through, or is reflected from, the paper ticket 120, and (c) a thermal heating element positioned adjacent to the second side of the paper ticket 120.

As noted above, the ticket reader 132 includes at least one light source, which is coupled to provide illumination to the first side of the paper ticket 120. In the example embodiment shown in FIG. 3, the ticket reader 132 includes a white light source 305 (for example, white light LEDs) for providing illumination in the visible light spectrum (for example, 400-700 nm) to the paper ticket 120. As described in more detail below, the white light source 305 may be used along with the at least one optical sensor for detecting ticket insertion, reading the encoded data 212 printed on the paper ticket 120, obtaining images of the paper ticket 120 and/or obtaining white light reflectance values from the paper ticket 120. In some embodiments, the ticket reader 132 may include one or more additional light sources, such as a UV light source 310 for providing illumination in the UV spectrum (for example, 200-400 nm) to the paper ticket 120 and/or an infrared (IR) light source (not shown) for providing illumination in the IR spectrum (for example, 700 nm-1 mm) to the paper ticket 120. When included within the ticket reader 132, the UV light source 310 may be used along with the at least one optical sensor for detecting an invisible ink marking on the paper ticket 120 and/or obtaining UV light reflectance values from the paper ticket 120. When included within the ticket reader 132, the IR light source (not shown) may be used along with the at least one optical sensor for detecting an invisible ink marking on the paper ticket 120 and/or obtaining IR light reflectance values from the paper ticket 120. As shown in FIG. 3, the at least one light source (e.g., the white light source 305 and the (optional) UV light source 310) is/are arranged above the paper channel 302 and configured to provide illumination to the first side of the paper ticket 120 (for example, the first side 210 of the paper ticket 200/230) when the paper ticket 120 is inserted within the ticket reader 132.

As noted above, the ticket reader 132 further includes at least one optical sensor, which is coupled to detect illumination that passes through, or is reflected from, the paper ticket 120. In the example embodiment shown in FIG. 3, ticket reader 132 includes a first optical sensor 315 and a second optical sensor 320. As described in more detail below, the first optical sensor 315 may be used to measure the transmittance of light through the paper ticket 120 for the purpose of detecting insertion of the paper ticket within the ticket reader 132. After ticket insertion is detected, the second optical sensor 320 may be activated for measuring the reflectance of light from the paper ticket 120 and/or obtaining images ("ticket images") of the paper ticket 120. Although included within the embodiment shown in FIG. 3, the first optical sensor 315 is an optional sensor, which may be omitted in some embodiments. When the first optical sensor 315 is omitted, the second optical sensor 320 may be activated continuously for measuring reflectance values and/or obtaining ticket images.

In the example embodiment shown in FIG. 3, the first optical sensor 315 is positioned within the paper channel 302 below the paper ticket 120 and used to detect illumination from the white light source 305 before and after ticket insertion. When a paper ticket 120 is inserted fully into the ticket reader 132, illumination from the white light source 305 is at least partially blocked by the paper ticket 120. The first optical sensor 315 measures the amount of illumination that passes through the paper ticket 120 and provides a corresponding sensor output signal (for example, a transmittance value) to the ticket reader controller 134, which uses the sensor output signal to detect ticket insertion.

The second optical sensor 320 is positioned above the paper channel 302 and used to obtain images ("ticket images") of the paper ticket 120 under various backlight conditions (for example, under white light, IR light and/or UV light conditions). The ticket images obtained by the second optical sensor 320 are provided to the ticket reader controller 134. In some embodiments, the second optical sensor 320 may be used to measure the amount of illumination that is reflected from the front side of the paper ticket 120 and provide a corresponding sensor output signal (for example, a reflectance value) to the ticket reader controller 134. The sensor output signal(s) provided by the second optical sensor 320 to the ticket reader controller 134 (for example, the ticket images and/or the reflectance values) can be used to validate the paper ticket 120, as described in more detail below.

In other embodiments (not shown in FIG. 3), the first optical sensor 315 may be used to measure the amount of illumination reflected from the back side of the paper ticket 120, and provide a corresponding sensor output signal (for example, a reflectance value) to the ticket reader controller 134. In order to obtain reflectance values from the back side of the paper ticket, an additional light source (such as, for example, a white light, IR light or UV light source) may be positioned within the paper channel 302 below the paper ticket 120 for providing illumination to the back side of the paper ticket 120. In some embodiments, reflectance values measured by the first optical sensor 315 and the second optical sensor 320 may be provided to the ticket reader controller 134 for ticket validation purposes.

The first optical sensor 310 and the second optical sensor 320 may each be implemented in a wide variety of ways. For example, the first optical sensor 315 may be implemented as a photodetector or a photodiode array. In some embodiments, the second optical sensor 320 may be an image sensor, such as a charge coupled device (CCD) sensor or a complementary metal oxide semiconductor (CMOS) sensor. In other embodiments, the second optical sensor 320 may be a camera having an image sensor and a lens. In some embodiments, the camera may include a fixed lens to avoid issues with autofocus. A wide variety of cameras may also be used to implement the second optical sensor 320. In some embodiments, the second optical sensor 320 may be implemented as a still frame camera, which is configured to capture and output one or more image frames of image data. In other embodiments, the camera may be a video camera, which is configured to capture and output a video stream of image data. In one example embodiment, the camera may be a universal serial bus (USB) video camera.

When the paper ticket 120 is inserted fully into the ticket reader 132, the paper channel 302 provided within the ticket reader 132: (a) positions the paper ticket 120 at a fixed distance from the second optical sensor 320 to ensure that the ticket images captured by the second optical sensor 320 are in focus, and (b) positions the encoded data 212 printed on the paper ticket 120 within the field of view (FOV) of the second optical sensor 320. The ticket images and/or the reflectance values obtained by the second optical sensor 320 are provided to the ticket reader controller 134 for validation purposes. As described in more detail below, the ticket reader controller 134 may use a wide variety of methods for validating the paper ticket 120 inserted within the ticket reader 132.

The ticket reader 132 shown in FIG. 3 further includes a thermal heating element 325, which is positioned within the paper channel 302 adjacent to a side of the paper ticket 120 (for example, the second side 220 of the paper ticket 200/230). After the paper ticket 120 is successfully validated by the ticket reader controller 134, the thermal heating element 325 is activated to thermally obfuscate at least a portion of the encoded data 212 printed on the paper ticket 120. The thermal obfuscation of the encoded data 212 voids the paper ticket 120 and prevents the paper ticket 120 from being reused.

The thermal heating element 325 may be implemented in a wide variety of ways. In one embodiment, the thermal heating element 325 may be implemented as a printed circuit board (PCB) having conductive traces printed thereon, a ceramic substrate based heating element or a metal substrate based heating element. Upon successful validation of the paper ticket 120, the thermal heating element 325 can be activated by supplying current to the conductive traces provided on the PCB, the ceramic substrate based heating element or the metal substrate based heating element. The current supplied to the thermal heating element 325 generates heat sufficient to activate the thermal paper and thermally obfuscate at least a portion of the encoded data 212. The amount of current supplied to the thermal heating element 325, and thus, the amount heat sufficient to activate the thermal paper, may generally depend on the characteristics of the thermal paper used to print the paper ticket 120. In some embodiments, approximately 0.6-8 amperes (A) of current may be supplied to the thermal heating element 325 to activate the thermal paper and partially or completely obscure the encoded data 212.

Figure 4:
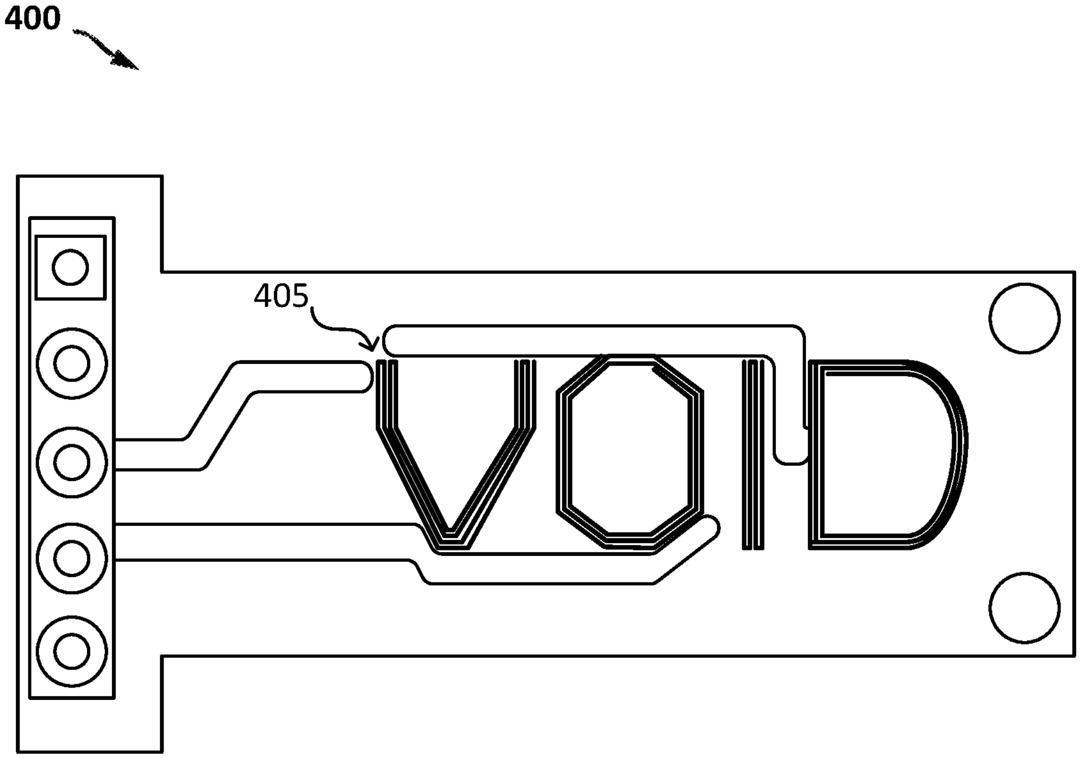
FIG. 4 illustrates one example of a thermal heating element in accordance with the present disclosure.

The conductive components of the thermal heating element 325 may take a wide variety of forms, such as a word (for example, "void," "done," "used," etc.), a letter (for example, "V," "D," "X," etc.), a shape (for example, a geometric shape, a line, etc.) or a symbol. FIG. 4 illustrates one embodiment of a PCB 400 having conductive traces 405 forming the word "VOID". Although an example embodiment is shown in FIG. 4, other embodiments of thermal heating elements may also be utilized, as long as the conductive components of the thermal heating element can be used to thermally obfuscate enough of the encoded data 212 to ensure that the encoded data is unreadable after obfuscation.

The ticket reader controller 134 shown in FIG. 3 includes at least one programmable integrated circuit (IC), which is programmed to control operations of the ticket reader 132 and determine the validity of the paper ticket 120 inserted into the ticket reader 132. In the example embodiment shown in FIG. 3, the ticket reader controller 134 includes a central processing unit (CPU) 330 and a microcontroller unit (MCU) 340. The ticket reader controller 134 further includes a first power switch 345, a second power switch 350 and a power regulator 355. Other hardware components not shown in FIG. 3 may additionally or alternatively be included within the ticket reader controller 134.

As shown in FIG. 3, MCU 340 is coupled to receive sensor output signals (for example, transmittance values) from the first optical sensor 315 and configured to use the sensor output signals to detect ticket insertion. The MCU 340 is further coupled to the first power switch 345 for controlling the white light source 305, the second power switch 350 for controlling the UV light source 310 and the power regulator 355 for supplying current to the thermal heating element 325.

When MCU 340 detects insertion of a paper ticket 120 within the ticket reader 132 (based on the sensor output signals received from the first optical sensor 315), the MCU 340 supplies a ticket reader activation signal to the CPU 330 to activate the ticket reader operations. Upon receiving the ticket reader activation signal from MCU 340, CPU 330 executes program instructions 335 to control operations of the ticket reader 132 (such as, for example, backlight control and heater activation) and determine the validity of the paper ticket 120 inserted into the ticket reader 132. In some embodiments, CPU 330 may utilize sensor output signals (for example, reflectance values and/or ticket images) to determine the validity of the paper ticket 120. The program instructions 335 executed by CPU 330 may be included within one or more applications or software modules (as shown, for example, in FIG. 5), which are stored within a non-transitory, computer-readable memory or storage device (for example, a random access memory (RAM), read only memory (ROM), Flash memory, hard disk drive (HDD), solid state drive (SSD), etc.).

Figure 5:
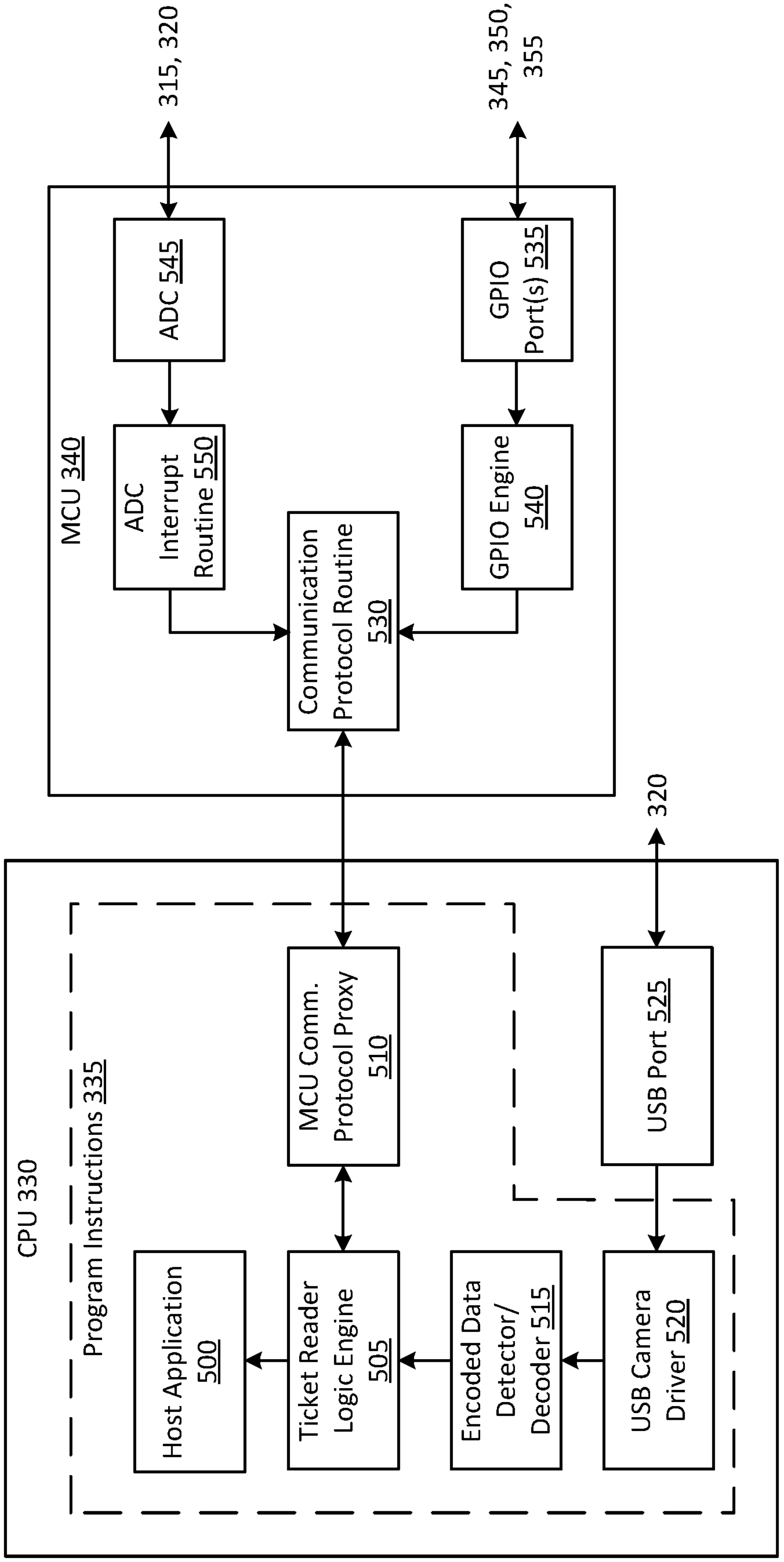
FIG. 5 is a block diagram illustrating example hardware and software components of the ticket reader controller in accordance with one embodiment of the present disclosure.

FIG. 5 provides a block diagram of example hardware and software components of CPU 330 and MCU 340 in accordance with one embodiment of the present disclosure. As shown in FIG. 5, the program instructions 335 executed by CPU 330 may include a host application 500, a ticket reader logic engine 505, an MCU communication protocol proxy 510, an encoded data detector/decoder 515, and a USB camera driver 520. The USB camera driver 520 controls operation of the camera (for example, second optical sensor 320) included within the ticket reader 132 and receives images of the paper ticket 120 from the second optical sensor 320 via the USB port 525. The encoded data detector/decoder 515 detects the encoded data 212 printed on the paper ticket 120 and decodes the encoded data 212 to obtain the information contained therein. The information obtained from the encoded data 212 is provided to the ticket reader logic engine 505.

The ticket reader logic engine 505 communicates with the MCU 340 via the MCU communication protocol proxy 510 (executed by the CPU 330) and the communication protocol routing 530 (executed by the MCU 340) to control various ticket reader operations (such as, for example, backlight control and heater activation) and receive various sensor output signals (such as, for example, reflectance and/or transmittance values) from the optical sensor(s) included within the ticket reader 132.

MCU 340 further includes one or more general purpose input/output (GPIO) ports 535, a GPIO engine 540, an analog to digital converter (ADC) 545 and an ADC interrupt routine 550. In some embodiments, the first power switch 345, the second power switch 350 and the power regulator 355 shown in FIG. 3 may be coupled to the GPIO ports 535 shown in FIG. 5 for receiving various enable/disable signals from the MCU 340. For example, MCU 340 may supply a first enable signal (White EN) to the first power switch 345 via a first GPIO port 535 to activate the white light source 305, and a second enable signal (UV EN) to the second power switch 350 via a second GPIO port 535 to activate the UV light source 310 included within the ticket reader 132. In addition, MCU 340 may supply a heater enable (Heater EN) signal to the power regulator 355 via a third GPIO port 535 to activate the thermal heating element 325 included within the ticket reader 132.

ADC 545 is coupled to receive analog sensor output signals from one or more of the optical sensors included within the ticket reader 132, and configured to convert the analog sensor output signals into digital values, which are supplied to the ticket reader logic engine 505 via 550, 530 and 510. In some embodiments, ADC 545 may receive analog sensor output signals (for example, transmittance values and/or reflectance values) from the first optical sensor 315 before and after ticket insertion. In such embodiments, ADC 545 may convert the analog sensor output signals from the first optical sensor 315 into digital values, which are supplied to the ticket reader logic engine 505 and used to detect insertion of a paper ticket 120 into the ticket reader 132 and/or determine the validity of the paper ticket 120 inserted within the ticket reader 132. In some embodiments, the ADC 545 may receive analog sensor output signals (for example, reflectance values) from the second optical sensor 320 after ticket insertion. In such embodiments, ADC 545 may convert the analog sensor output signals received from the second optical sensor 320 into digital values, which are supplied to the ticket reader logic engine 505 and used to determine the validity of the paper ticket 120 inserted within the ticket reader 132.

The host application 500 communicates with the ticket reader logic engine 505 to control operations of the ticket reader 132 and determine the validity of the paper ticket 120 inserted into the ticket reader 132. The host application 500 may utilize a wide variety of methods to validate the paper ticket 120 inserted into the ticket reader 132.

In some embodiments, the host application 500 may attempt to validate the paper ticket 120 based on media printed on, or embedded within, the paper ticket 120. For example, a first validation method used by the host application 500 may determine whether the encoded data 212 printed on the paper ticket 120 is valid. A second validation method used by the host application 500 may determine whether invisible ink (for example, a UV or IR marking) is present on the paper ticket 120. Other validation methods may additionally or alternatively be used by the host application 500 to validate the paper ticket 120 based on media printed on, or embedded within, the paper ticket 120.

In the first validation method, the second optical sensor 320 obtains a ticket image of the paper ticket 120 while the white light source 305 is activated. The ticket image, which may be supplied to the CPU 330 via the USB port 525 and USB camera driver 520, is analyzed by the encoded data detector/decoder 515 to detect the encoded data 212 printed on the paper ticket 120. If encoded data 212 is detected within the ticket image, the encoded data detector/decoder 515 decodes the encoded data 212 to obtain the information originally used to generate the encoded data (such as, for example, the ballot style, the username of the voter, the digital signature of the username, the election ID and/or the voter-specific nonce). The decoded information is then provided to the host application 500 for validation. The host application 500 may: (a) validate the paper ticket 120 if the information obtained from the encoded data 212 contains data specific to the current election (for example, the correct election ID or ballot style), or (b) invalidate the paper ticket 120 if the information obtained from the encoded data 212 does not contain data specific to the current election.

In the second validation method, the second optical sensor 320 obtains a ticket image of the paper ticket 120 while the UV light source 310 (or an IR light source) is activated. The ticket image, which may be supplied to the CPU 330 via the USB port 525 and USB camera driver 520, is analyzed by the host application 500 to determine if an invisible ink marking (such as, for example, invisible ink marking 216) is present on the paper ticket 120. Detecting an invisible ink marking on the paper ticket 120 proves that the paper ticket is original (not a copy) and came from a trusted source. Thus, the host application 500 may: (a) validate the paper ticket 120 if an invisible ink marking is detected on the paper ticket 120, or (b) invalidate the paper ticket 120 if an invisible ink marking is not detected on the paper ticket 120.

In other embodiments, the host application 500 may attempt to validate the paper ticket 120 based on characteristics of the paper on which the paper ticket 120 is printed. As noted above, the paper ticket 120 printed by the ticket printer 112 may be printed on thermal paper. Thermal paper is differentiated from other types of paper by having at least one thermally coated side. Unlike other types of paper, the thermal coating provided on thermal paper is activated by heat. Thermal paper is further differentiated from other types of paper by exhibiting different values of reflectance on opposite sides of the paper (since one side is thermally coated, while the other is not). In some embodiments, the host application 500 may utilize validation methods that exploit these characteristics to determine whether the printed ticket 120 is printed on thermal paper, as opposed to other types of paper (for example, printer paper or photocopy paper). Although the examples below pertain to validating paper tickets printed on thermal paper, one skilled in the art would understand how other validation methods may additionally or alternatively be used by the host application 500 to validate a paper ticket 120 based on characteristics of the paper on which the paper ticket 120 is printed.

In some embodiments, a third validation method used by the host application 500 may attempt to validate the paper ticket 120 by determining whether a thermal marking can be produced on the paper ticket 120. In the third validation method, the second optical sensor 320 obtains a first ticket image of the paper ticket 120 while the white light source 305 is activated. After the first image is obtained, a heater activation signal is sent to the MCU 340 to activate the thermal heating element 325 positioned below the paper ticket 120. Upon receiving the heater activation signal, MCU 340 supplies a heater enable (heater EN) signal to the power regulator 355, which causes the power regulator 355 to supply current to the thermal heating element 325. If the paper ticket 120 inserted into the ticket reader 132 is printed on thermal paper, the current supplied to the thermal heating element 325 will generate an amount of heat, which is sufficient to thermally mark the paper ticket 120 with a predetermined thermal mark. However, a thermal mark will not be generated on the paper ticket 120 if the paper ticket is printed on other types of paper (for example, printer paper or photocopy paper).

The thermal heating element 325 may utilize a variety of methods to thermally mark the paper ticket with a predetermined mark. In some embodiments, a predetermined mark may be formed on the paper ticket 120 by the conductive traces 405 shown in FIG. 4. In other embodiments, other conductive traces (not shown) may be provided on the thermal heating element 325 for the purpose of generating a predetermined thermal mark on the paper ticket 120. In further embodiments, a ceramic substrate based heating element or a metal substrate based heating element may be used to generate a predetermined thermal mark on the paper ticket 120.

After the thermal heating element 325 is activated, the second optical sensor 320 obtains a second ticket image of the paper ticket 120 while the white light source 305 is activated. The host application 500 compares the second ticket image to the first ticket image to determine if a predetermined mark is generated on the paper ticket 120. The host application 500 may: (a) validate the paper ticket 120 if the comparison shows that the predetermined mark is produced on the paper ticket 120 by the thermal heating element 325, or (b) invalidate the paper ticket 120 if the comparison shows the predetermined mark is not produced on the paper ticket 120 by the thermal heating element 325.

In some embodiments, a fourth validation method used by the host application 500 may attempt to validate the paper ticket 120 by comparing a reflectance value measured from the paper ticket 120 to a range of reflectance values corresponding to thermal paper. In the fourth validation method, the host application 500 may detect an amount of the illumination that is reflected from the paper ticket 120 (i.e., reflectance values), generate a digital value corresponding to the amount of the illumination that is reflected from the paper ticket 120, and either: (a) validate the paper ticket 120 if the digital value falls within a range of digital values corresponding to thermal paper, or (b) invalidate the paper ticket 120 if the digital value does not fall within the range of digital values corresponding to thermal paper.

In some embodiments, the second optical sensor 320 may be used to measure a reflectance value from the front side of the paper ticket 120 while the paper ticket 120 is illuminated with light from the white light source 305. The reflectance value measured from the front side of the paper ticket 120 is converted to a digital value (for example, by ADC 545) and compared to a range of digital values, which correspond to known reflectance values from thermal paper illuminated with light in the visible light spectrum (for example, 400-700 nm). The host application 500 may invalidate the paper ticket 120 if the digital value of measured reflectance does not match the expected results.

In some embodiments, the second optical sensor 320 may be used to measure a reflectance value from the front side of the paper ticket 120 while the paper ticket 120 is illuminated with light from the UV light source 310. The reflectance value measured from the front side of the paper ticket 120 is converted to a digital value (for example, by ADC 545) and compared to a range of digital values, which correspond to known reflectance values from thermal paper illuminated with light in the UV light spectrum (for example, 200-400 nm). The host application 500 may invalidate the paper ticket 120 if the digital value of measured reflectance does not match the expected results.

In some embodiments, the second optical sensor 320 may be used to measure a reflectance value from the front side of the paper ticket 120 while the paper ticket 120 is illuminated with light from an IR light source (not shown). The reflectance value measured from the front side of the paper ticket 120 is converted to a digital value (for example, by ADC 545) and compared to a range of digital values, which correspond to known reflectance values from thermal paper illuminated with light in the IR light spectrum (for example, 700 nm-1 mm). The host application 500 may invalidate the paper ticket 120 if the digital value of measured reflectance does not match the expected results.

In some embodiments, the first optical sensor 315 may additionally or alternatively be used to measure a reflectance value from the back side of the paper ticket 120 while the paper ticket 120 is illuminated with light from an additional light source (for example, a UV light source, white light source or IR light source, not shown) positioned below the paper ticket 120. The reflectance value measured from the back side of the paper ticket 120 is converted to a digital value (for example, by ADC 545) and compared to a range of digital values, which correspond to known reflectance values from thermal paper illuminated with light in the UV light spectrum (for example, 200-400 nm), visible light spectrum (for example, 400-700 nm) or IR light spectrum (for example, 700 nm-1 mm). The host application 500 may invalidate the paper ticket 120 if the digital value(s) of measured reflectance do not match the expected results.

Figure 6:
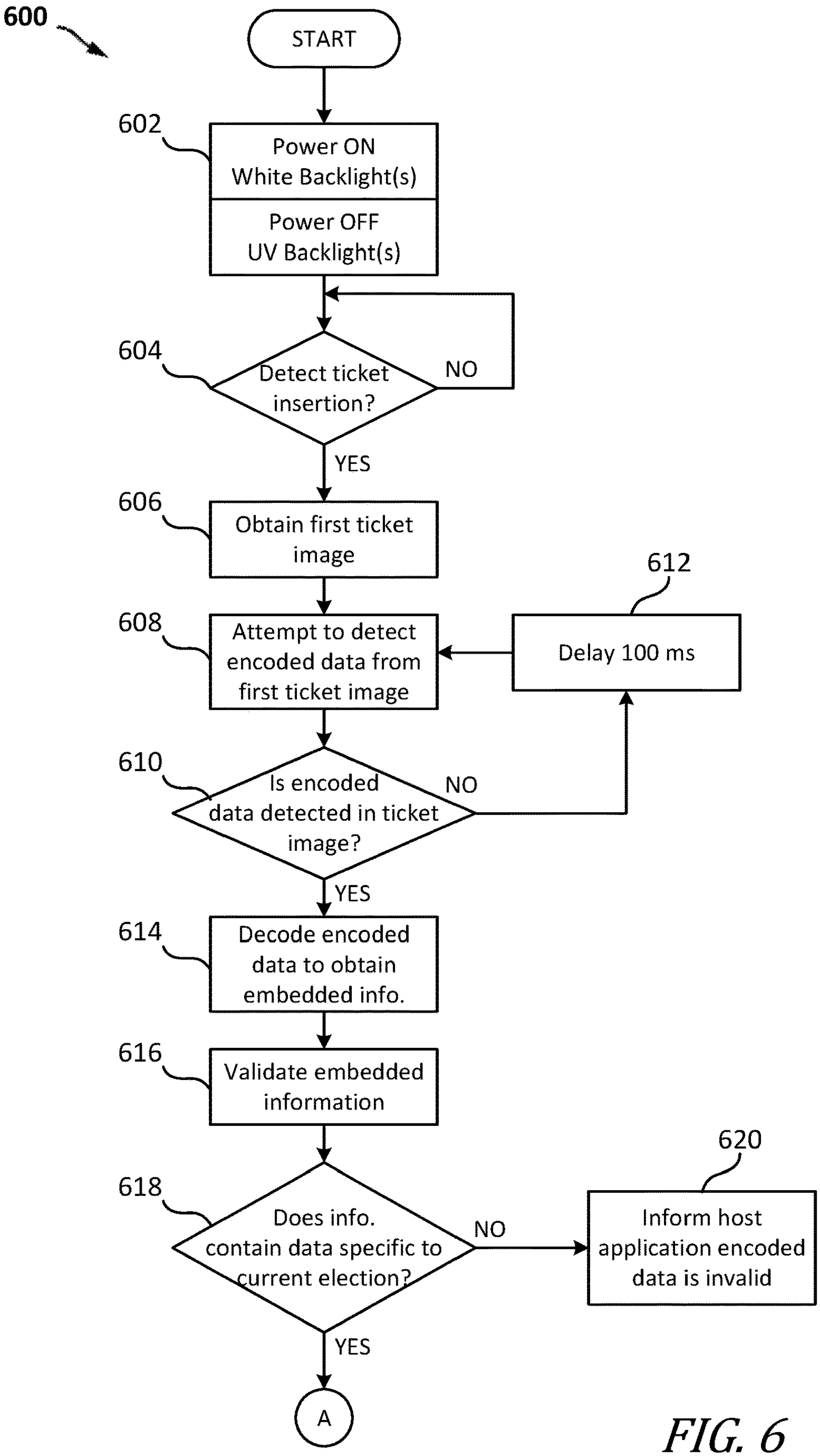
FIG. 6 is a process flow diagram illustrating an example process flow for validating a paper ticket.
Figure 6:
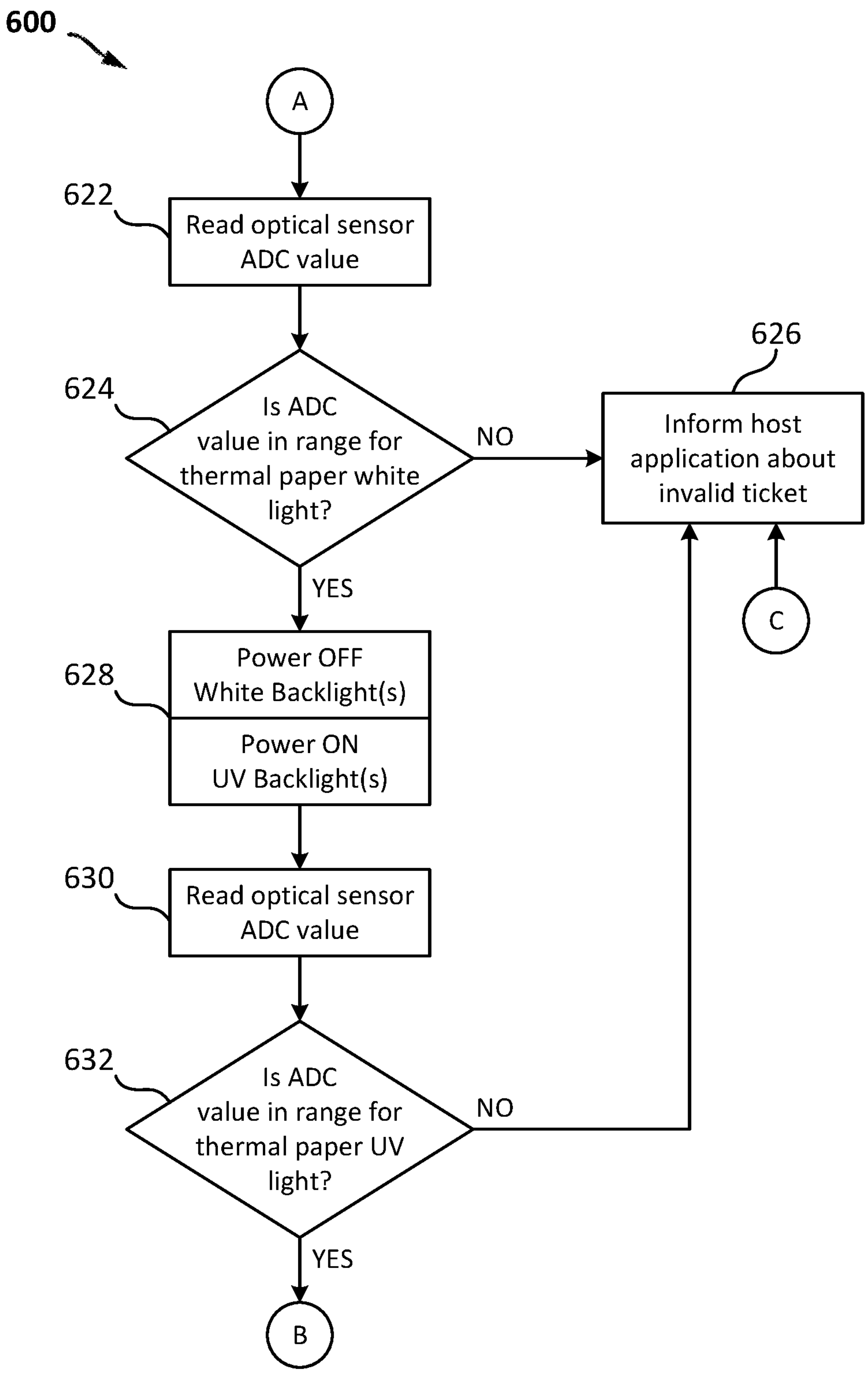
Figure 6:
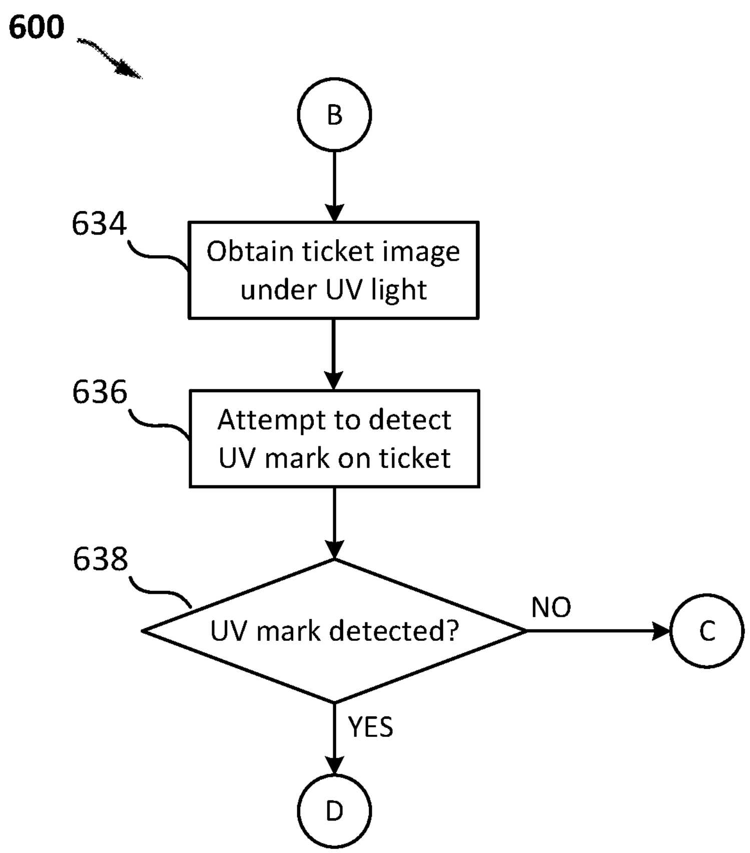
Figure 6:
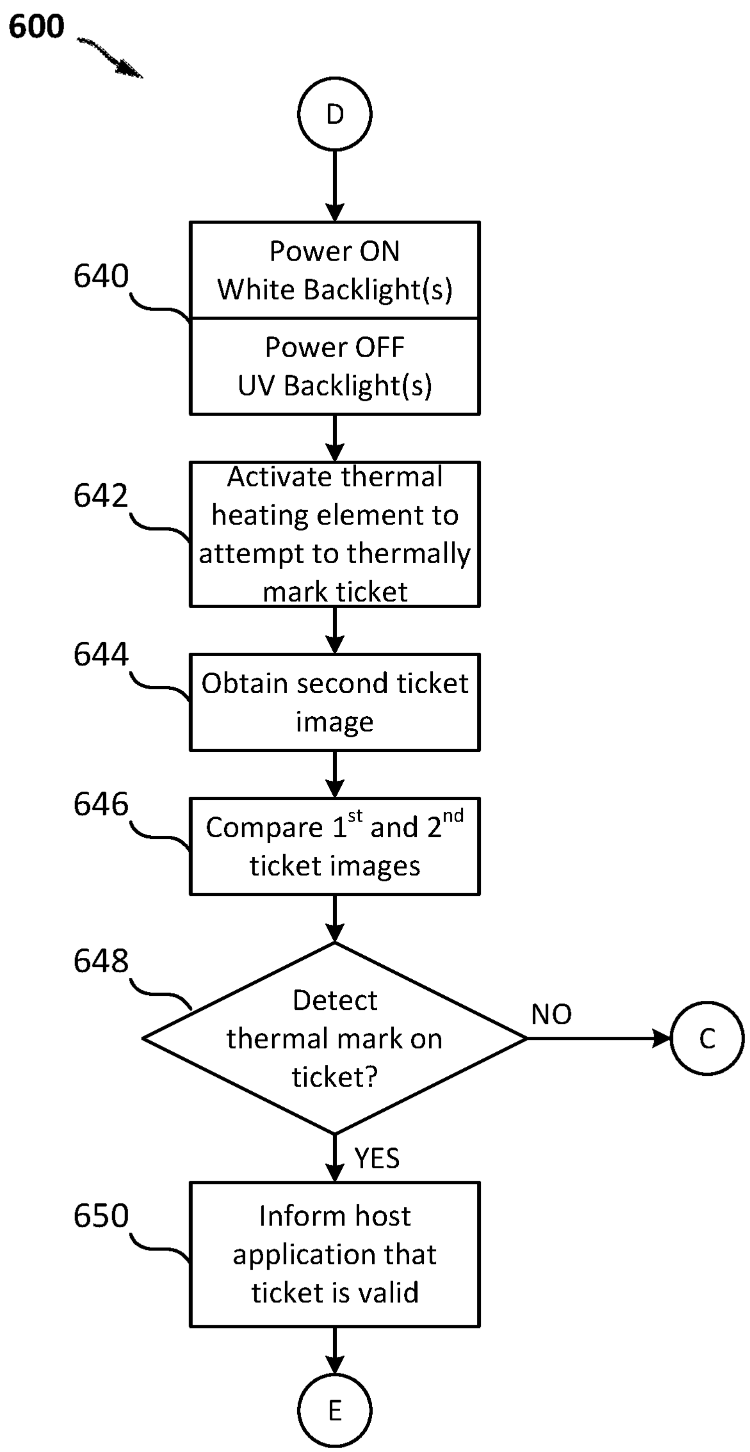

FIG. 6 illustrates an example process flow 600 that can be used by the ticket reader 132 and ticket reader controller 134 described herein to validate a paper ticket. In some embodiments, process flow 600 may begin (in step 602) by turning on the white backlights (for example, white light source 305) and turning off the UV backlights (for example, UV light source 310) while waiting for ticket insertion. When insertion of a paper ticket is detected (YES branch of step 604), process flow 600 obtains a first ticket image of the paper ticket (in step 606) and attempts to read encoded data from the first ticket image (in steps 608, 610 and 612).

Step 608 attempts to detect encoded data from a first ticket image. If encoded data is not detected (step 610), the process proceeds to step 612 which is a 100 millisecond (ms) delay and then proceeds back to step 608. If encoded data is detected within the first ticket image (YES branch of step 610), process flow 600 decodes the encoded data to obtain the information embedded therein (in step 614) and validates the information obtained from the encoded data (in step 616) to determine if the information contains data specific to the current election (in step 618). If the information does not contain election specific data (NO branch of step 618), the process flow 600 informs the host application that the encoded data is invalid (in step 620). As noted above, the host application may invalidate the paper ticket if the encoded data printed on the paper ticket is determined to be invalid.

If the information obtained from the encoded data is determined to be valid (YES branch of step 618), the process flow 600 may continue to validate the paper ticket using one or more methods of validation, as described further herein. For example, the process flow 600 may determine whether a reflectance value measured from the paper ticket corresponds to known values of reflectance for thermal paper illuminated with white light in steps 622-624. In one embodiment, the process flow 600 may read the optical sensor ADC value (obtained, for example, by optical sensor 315/320 and ADC 545) (in step 622) while the paper ticket is illuminated with white light (step 602), and may compare the optical sensor ADC value to a range of digital values, which correspond to known reflectance values from thermal paper illuminated with light in the visible light spectrum (in step 624). If the optical sensor ADC value does not fall within the known range of digital values (NO branch of step 624), the process flow 600 informs the host application that the paper ticket is invalid (in step 626).

In some embodiments (not shown), process flow 600 may inform the host application that the paper ticket is valid (in step 650) if the optical sensor ADC value matches the reflectance values expected for thermal paper illuminated with white light in step 624. In other embodiments, process flow 600 may perform one or more additional method(s) to further validate (or invalidate) the paper ticket in steps 628-632, steps 634-338 and/or steps 640-648.

In some embodiments, for example, the process flow 600 may determine whether a reflectance value measured from the paper ticket corresponds to known values of reflectance for thermal paper illuminated with UV light in steps 628-632. After turning off the white backlights and turning on the UV backlights (in step 628), process flow 600 may read the optical sensor ADC value (obtained, for example, by optical sensor 315/320 and ADC 545) (in step 630), and compare the optical sensor ADC value to a range of digital values, which correspond to known reflectance values from thermal paper illuminated with light in the UV light spectrum (in step 632). If the optical sensor ADC value does not fall within this range of digital values (NO branch of step 632), the process flow 600 informs the host application that the paper ticket is invalid (in step 626).

In some embodiments, the process flow 600 may perform additional validation under UV backlight conditions. For example, the process flow may determine whether an invisible ink marking is present on the paper ticket in steps 634-638. To determine whether an invisible ink marking is present on the paper ticket, the process flow 600 may obtain a ticket image of the paper ticket while the paper ticket is illuminated with UV light (in step 634), and analyze the ticket image to attempt to detect an invisible ink marking on the paper ticket (in step 636). If an invisible ink marking is not detected (NO branch of step 638), the process flow 600 informs the host application that the paper ticket is invalid (in step 626).

In some embodiments, the process flow 600 may determine whether a thermal marking can be produced on the paper ticket in steps 640-648. After turning on the white backlights and turning off the UV backlights (in step 640), the process flow 600 may activate the thermal heating element in an attempt to thermally mark the paper ticket (in step 642), obtain a second ticket image of the paper ticket (in step 644) and compare the second ticket image to the first ticket image (in step 646). If a thermal marking is not detected in the second ticket image (NO branch of step 648), the process flow 600 informs the host application that the paper ticket is invalid (in step 626).

In the embodiment shown in FIG. 6, the process flow 600 informs the host application that the paper ticket is valid (in step 650) if all of the following occur: (a) the information embedded within the encoded data is determined to contain data specific to the current election in step 618, (b) the optical sensor ADC value read in step 622 matches reflectance values expected for thermal paper illuminated with white light in step 624, (c) the optical sensor ADC value read in step 630 matches reflectance values expected for thermal paper illuminated with UV light in step 632, (d) an invisible ink marking is detected on the paper ticket in step 638, and (e) a thermal mark is detected on the paper ticket in step 648. Alternatively, the paper ticket could be determined to be valid based upon an occurrence of a specified subset of events (a)-(e). Thus, the process flow 600 shown in FIG. 6 utilizes a plurality of validation methods for validating a paper ticket inserted into a ticket reader.

While a plurality of validation methods are shown in FIG. 6, the techniques described herein are not strictly limited to the particular validation methods shown in FIG. 6 or the order in which they are described. In some embodiments, the process flow 600 may use only one validation method, a subset of the validation methods or all of the validation methods shown in FIG. 6 to validate (or invalidate) a paper ticket. Any combination of validation methods may be used, and performed in any order, to validate (or invalidate) a paper ticket inserted into the ticket reader 132.

Figure 7:
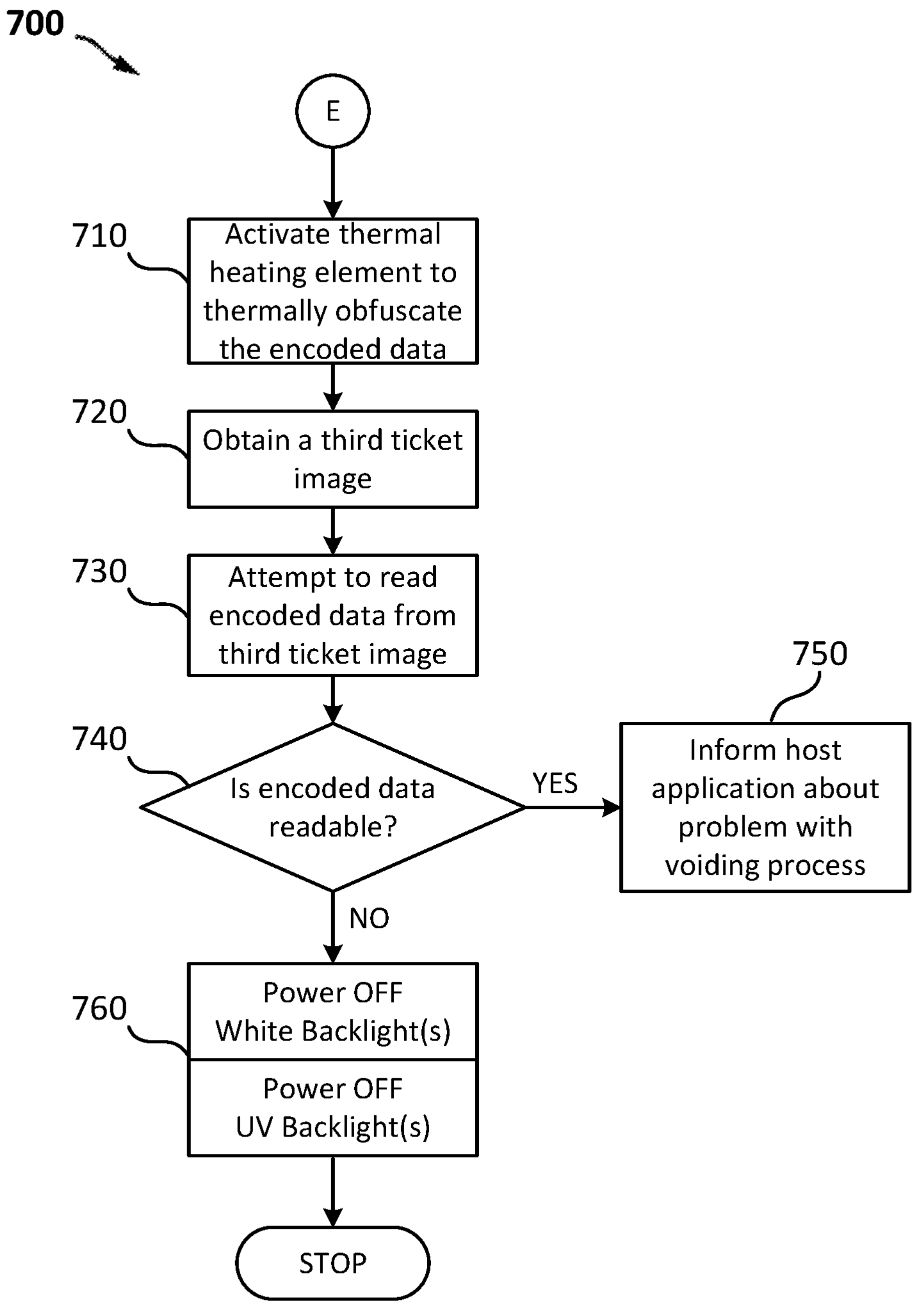
FIG. 7 is a process flow diagram illustrating an example process flow for voiding a paper ticket after successful validation.

FIG. 7 illustrates an example process flow 700 that can be used by the ticket reader 132 and ticket reader controller 134 described herein to void a paper ticket after the paper ticket is successfully validated. In some embodiments, the process flow 700 shown in FIG. 7 may be used to void a paper ticket after one or more of the validation methods shown in steps 608-618, steps 628-632, steps 634-338 and/or steps 640-648 of FIG. 6 is performed to validate the paper ticket. As noted above, voiding a validated paper ticket prevents the paper ticket from being reused.

The process flow 700 shown in FIG. 7 voids a paper ticket after successful ticket validation by activating the thermal heating element, so as to thermally obfuscate at least a portion of the encoded data printed on the paper ticket (in step 710). After activating the thermal heating element for a period of time and power level sufficient to thermally obfuscate the encoded data, the process flow 700 may obtain a third ticket image of the paper ticket (in step 720) and attempt to read the encoded data printed on the paper ticket from the third ticket image (in step 730). If the encoded data is still readable after attempting thermal obfuscation (YES branch of step 740), the process flow 700 informs the host application there is a problem with the ticket voiding process (in step 750). Otherwise, the process flow 700 turns off the ticket reader backlights (in step 760) and the process flow 700 ends.

Figure 8A:
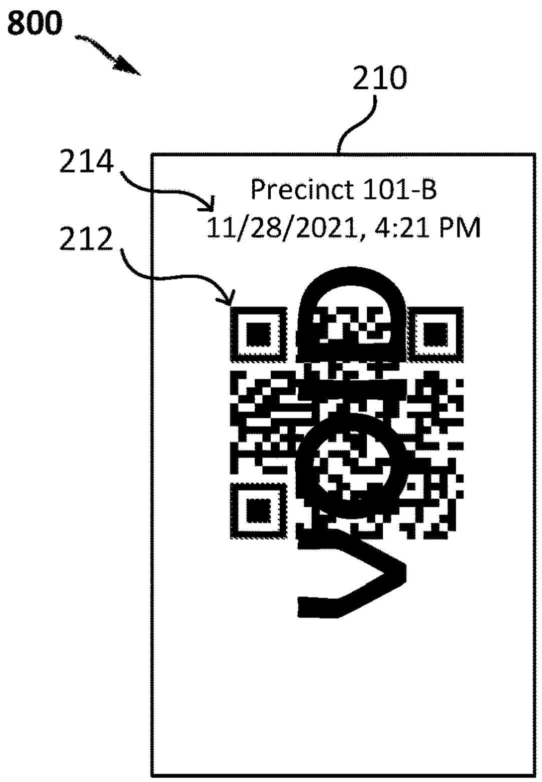
FIGS. 8A-8D illustrate various examples of voided paper tickets.
Figure 8B:
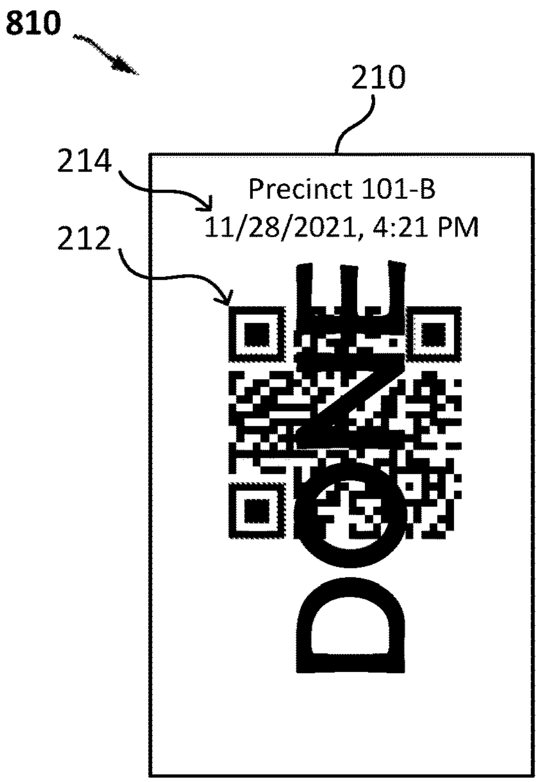
Figure 8C:
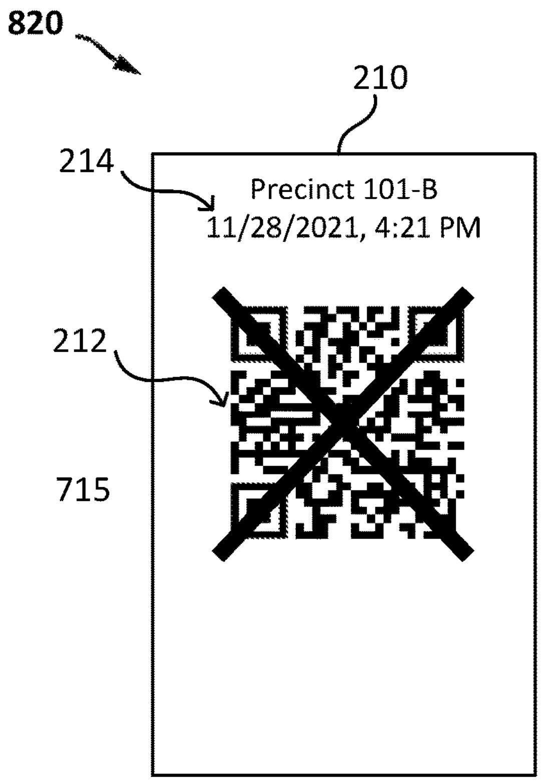
Figure 8D:
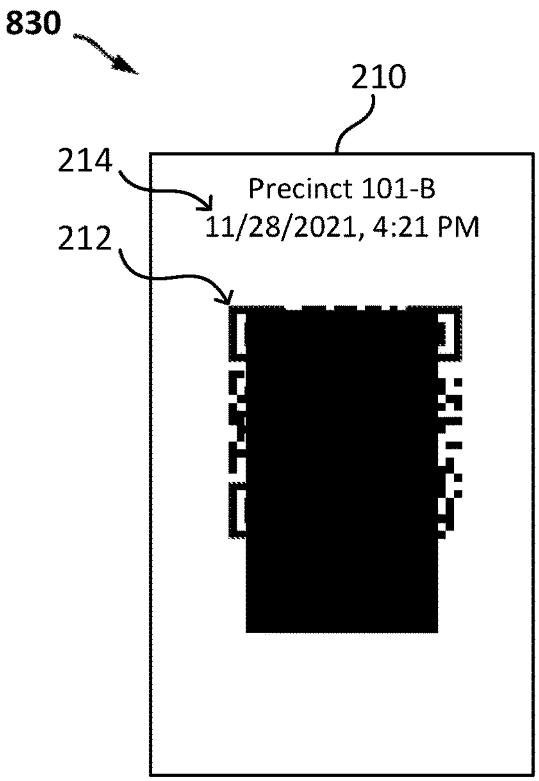

FIGS. 8A-8D illustrate various examples of voided paper tickets. The paper tickets 800, 810, 820 and 830 shown in FIGS. 8A-8D are similar to the paper tickets 220 and 230 shown in FIGS. 2A and 2B in that they include encoded data 212 and (optionally) metadata 214 printed on a first side 210 of the paper ticket. The paper ticket 800 shown in FIG. 8A and the paper ticket 810 shown in FIG. 8B are voided by thermally obfuscating the encoded data 212 with the words "VOID" and "DONE," respectively. Other words indicative of invalidity, or prior use, may also be used. In the embodiments shown in FIGS. 8C and 8D, paper tickets 820 and 830 are voided by thermally obfuscating the encoded data 212 with an "X" and a rectangle, respectively. Other letters, shapes and/or symbols may also be used.

An electronic voting device having an improved ticket reader 132 and ticket reader controller 134 is described above. The electronic voting device described herein improves upon conventional electronic voting devices by providing a ticket reader 132 and ticket reader controller 134 for validating and subsequently voiding a paper ticket. Unlike conventional electronic voting devices, which require poll worker intervention or a centralized network controller to manually input or validate an access code printed on a paper ticket, the electronic voting device shown and described herein performs ticket validation and voiding functions entirely within the ticket reader 132. This enables voters to access an electronic voting device that is not connected to a centralized network controller, and self-activate a corresponding ballot style without poll worker intervention. Other advantages not specifically mentioned herein may also be apparent to the skilled artisan.

Figure 9:
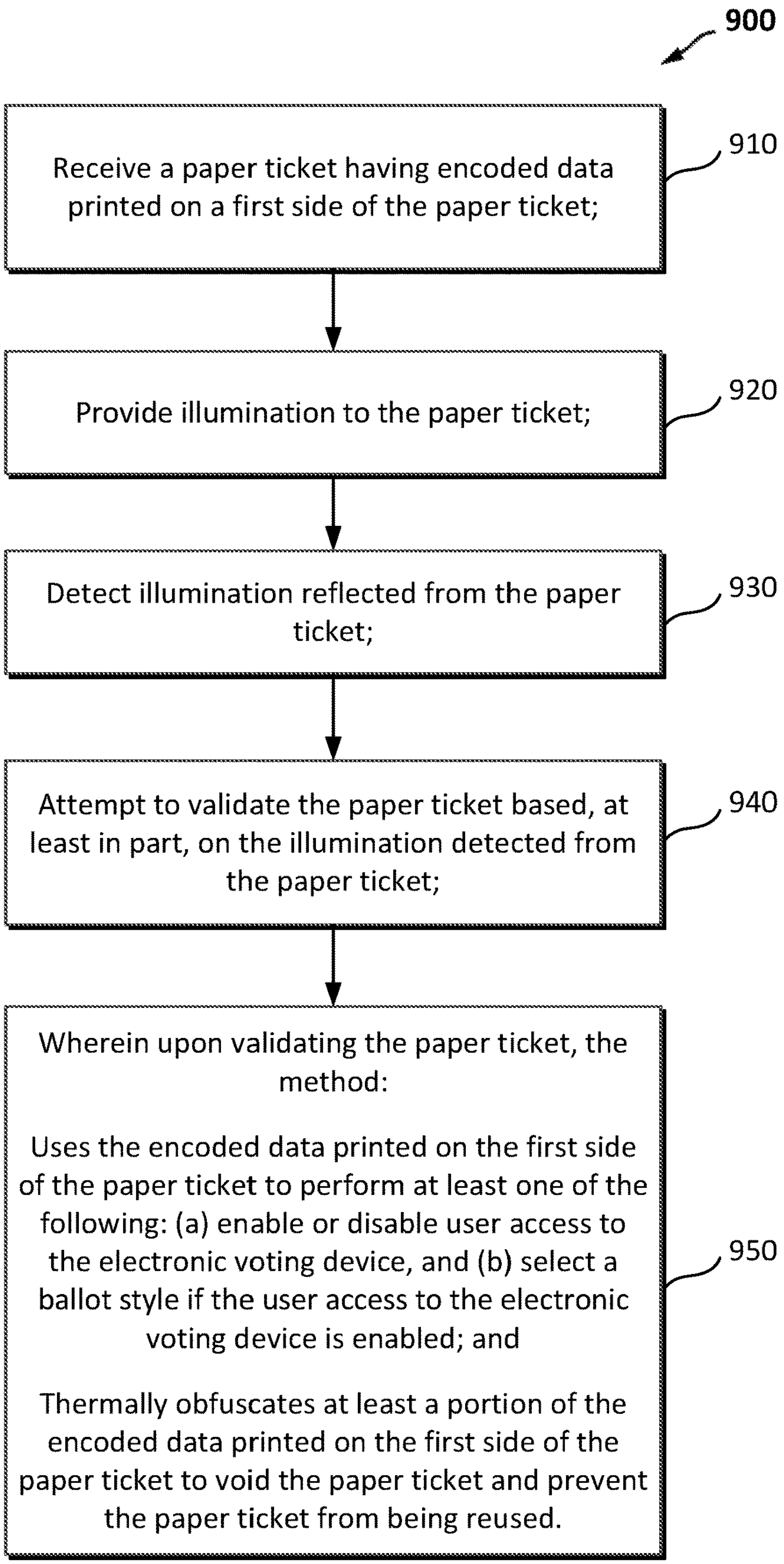
FIG. 9 is a flow chart diagram illustrating one embodiment of a method for validating and subsequently voiding a paper ticket used to access an electronic voting device in accordance with the present disclosure.

FIG. 9 illustrates one embodiment of a method 900 for validating and subsequently voiding a paper ticket in accordance with the present disclosure. The method 900 shown in FIG. 9 is a method that may be used to access an electronic voting device and/or select a ballot style to be used for voting on the electronic voting device. Examples of electronic voting devices that may use the method 900 are shown in FIGS. 1, 3 and 5 and described above. Although example configurations are provided herein, one skilled in the art having the benefit of this disclosure would understand how other electronic voting devices having a ticket reader and a ticket reader controller, as described herein, may also use the method 900 shown in FIG. 9.

It will be recognized that the embodiment shown in FIG. 9 is exemplary and additional methods may utilize the techniques described herein. Further, additional steps may be added to the method shown in the FIG. 9 as the steps described are not intended to be exclusive. Moreover, the order of the steps is not limited to the order shown in FIG. 9 as different orders may occur and/or various steps may be performed in combination or at the same time.

The method 900 shown in FIG. 9 may begin by receiving a paper ticket having encoded data printed on a first side of the paper ticket (in step 910), providing illumination to the paper ticket (in step 920) and detecting illumination reflected from the paper ticket (in step 930). In step 940, the method 900 attempts to validate the paper ticket based, at least in part, on the illumination detected from the paper ticket (in step 930). The method may use a wide variety of methods to validate the paper ticket in step 940.

In one embodiment, the method 900 may attempt to validate the paper ticket (in step 940) by generating a digital value corresponding to an amount of illumination that is reflected from the paper ticket. In such an embodiment, the method 900 may: (a) validate the paper ticket if the digital value falls within a range of digital values corresponding to thermal paper, and (b) invalidate the paper ticket if the digital value does not fall within the range of digital values corresponding to thermal paper.

In another embodiment, the method 900 may attempt to validate the paper ticket (in step 940) by obtaining an image of the first side of the paper ticket while the paper ticket is illuminated with UV illumination or IR illumination, and analyzing the image to determine the presence or absence of an invisible ink marking on the paper ticket. In such an embodiment, the method 900 may: (a) validate the paper ticket if the invisible ink marking is detected on the paper ticket, and (b) invalidate the paper ticket if the invisible ink marking is not detected on the paper ticket.

In yet another embodiment, the method 900 may attempt to validate the paper ticket (in step 940) by obtaining a first image of the first side of the paper ticket and activating a thermal heating element positioned adjacent to a second side of the paper ticket to attempt to thermally mark the paper ticket. Next, the method 900 may obtain a second image of the first side of the paper ticket, and compare the second image to the first image. In such an embodiment, the method 900 may: (a) validate the paper ticket if the comparison shows a thermal mark is produced on the paper ticket by the thermal heating element, and (b) invalidate the paper ticket if the comparison shows a thermal mark is not produced on the paper ticket by the thermal heating element.

The method 900 shown in FIG. 9 may perform additional steps upon validating the paper ticket (in step 940). For example, the method 900 may use the encoded data printed on the first side of the paper ticket to enable/disable user access to the electronic voting device and/or select a ballot style, and thermally obfuscate the encoded data printed on the first side of the paper ticket to void the paper ticket and prevent the paper ticket from being reused (in step 950). In some embodiments, the method 900 may thermally obfuscate the encoded data by generating a thermal mark over at least a portion of the encoded data, wherein the thermal mark includes a word, a letter, a shape or a symbol. In some embodiments, a thermal heating element may be positioned adjacent to a second side of the paper ticket, and the method 900 may thermally obfuscate the encoded data by supplying current to the thermal heating element to generate an amount of heat, which is sufficient to activate the thermal paper and thermally obfuscate at least a portion of the encoded data printed on the first side of the paper ticket.

Other advantages may be apparent to those skilled in the art in view of this description. In addition, further modifications and alternative embodiments of the inventions described herein will be apparent to those skilled in the art in view of this description. Accordingly, this description is to be construed as illustrative only and is for the purpose of teaching those skilled in the art the manner of carrying out the inventions. It is to be understood that the forms and methods of the inventions herein shown and described are to be taken as presently preferred embodiments. Equivalent techniques may be substituted for those illustrated and described herein and certain features of the inventions may be utilized independently of the use of other features, all as would be apparent to one skilled in the art after having the benefit of this description of the inventions.

What is claimed is:

1. An electronic voting device, comprising:

a paper slot configured to receive a paper ticket having encoded data printed on a first side of the paper ticket;

at least one light source coupled to provide illumination to the paper ticket;

at least one optical sensor coupled to detect illumination that passes through, or is reflected from, the paper ticket;

a thermal heating element positioned adjacent to the paper ticket; and at least one programmable integrated circuit (IC) configured to execute program instructions to:

attempt to validate the paper ticket based, at least in part, on the illumination detected by the at least one optical sensor; and upon validating the paper ticket, activate the thermal heating element to obfuscate the encoded data printed on the first side of the paper ticket and void the paper ticket.

2. The electronic voting device of claim 1, wherein the thermal heating element comprises a printed circuit board having conductive traces printed thereon, a ceramic substrate based heating element or a metal substrate based heating element.

3. The electronic voting device of claim 2, wherein the conductive traces printed on the printed circuit board, the ceramic substrate based heating element or the metal substrate based heating element form a word, a letter, a shape or a symbol.

4. The electronic voting device of claim 2, wherein the paper ticket comprises thermal paper, and wherein upon activating the thermal heating element, current is supplied to the conductive traces printed on the printed circuit board, the ceramic substrate based heating element or the metal substrate based heating element to generate an amount of heat that is sufficient to activate the thermal paper and thermally obfuscate at least a portion of the encoded data printed on the first side of the paper ticket.

5. The electronic voting device of claim 1, wherein after validating the paper ticket, the at least one programmable IC is further configured to execute the program instructions to:

use the encoded data to perform at least one of the following: (a) enable or disable user access to the electronic voting device, and (b) select a ballot style if the user access to the electronic voting device is enabled; and wherein activating the thermal heating element to obfuscate the encoded data printed on the first side of the paper ticket prevents the paper ticket from being reused.

6. The electronic voting device of claim 1, wherein the encoded data is printed on the first side of the paper ticket as a QR code, a barcode or another machine-readable code.

7. The electronic voting device of claim 1, wherein the at least one optical sensor comprises a photodetector, a photodiode array or an image sensor.

8. The electronic voting device of claim 1, wherein when attempting to validate the paper ticket, the at least one programmable IC is configured to execute the program instructions to:

generate a digital value corresponding to an amount of the illumination that is reflected from the paper ticket and detected by the at least one optical sensor;

validate the paper ticket if the digital value falls within a range of digital values corresponding to thermal paper; and invalidate the paper ticket if the digital value does not fall within the range of digital values corresponding to thermal paper.

9. The electronic voting device of claim 8, wherein the at least one light source comprises a first light source, and wherein the range of digital values correspond to a range of reflectance values obtained from thermal paper illuminated with light in the visible light spectrum.

10. The electronic voting device of claim 8, wherein the at least one light source comprises a second light source, and wherein the range of digital values correspond to a range of reflectance values obtained from thermal paper illuminated with light in an infrared (IR) or ultra-violet (UV) light spectrum.

11. The electronic voting device of claim 1, wherein the at least one light source comprises an ultra-violet (UV) light source for illuminating the paper ticket with light in the UV light spectrum or an infrared (IR) light source for illuminating the paper ticket with light in the IR light spectrum, and wherein when attempting to validate the paper ticket, the at least one programmable IC is configured to execute the program instructions to:

obtain an image of the first side of the paper ticket from the at least one optical sensor, wherein the image is obtained from an image frame or a video stream captured by the at least one optical sensor while the paper ticket is illuminated with light in the UV light spectrum or the IR light spectrum;

analyze the image to determine the presence or absence of an invisible ink marking on the paper ticket;

validate the paper ticket if the invisible ink marking is detected on the paper ticket; and invalidate the paper ticket if the invisible marking is not detected on the paper ticket.

12. The electronic voting device of claim 1, wherein the at least one light source comprises a white light source for illuminating the paper ticket with light in the visible light spectrum, and wherein when attempting to validate the paper ticket, the at least one programmable IC executes the program instructions to:

obtain a first image of the first side of the paper ticket from the at least one optical sensor, wherein the first image is obtained from a first image frame or a first video stream captured by the at least one optical sensor while the paper ticket is illuminated with light in the visible light spectrum;

activate the thermal heating element to attempt to thermally mark the paper ticket;

obtain a second image of the first side of the paper ticket from the at least one optical sensor, wherein the second image is obtained from a second image frame or a second video stream captured by the at least one optical sensor while the paper ticket is illuminated with light in the visible light spectrum;

compare the second image to the first image;

validate the paper ticket if the comparison shows a thermal mark is produced on the paper ticket by the thermal heating element; and invalidate the paper ticket if the comparison shows a thermal mark is not produced on the paper ticket by the thermal heating element.

13. The electronic voting device of claim 1, wherein the at least one programmable IC is configured to execute the program instructions to validate the paper ticket automatically without poll worker intervention or communicating information across a network.

14. The electronic voting device of claim 1, wherein the electronic voting device is not connected to a network.

15. A method for validating and subsequently voiding a paper ticket used to access an electronic voting device, the method comprising:

receiving a paper ticket having encoded data printed on a first side of the paper ticket;

providing illumination to the paper ticket;

detecting illumination reflected from the paper ticket;

attempting to validate the paper ticket based, at least in part, on the illumination detected from the paper ticket; and wherein upon validating the paper ticket, the method further comprises:

using the encoded data printed on the first side of the paper ticket to perform at least one of the following: (a) enable or disable user access to the electronic voting device, and (b) select a ballot style if the user access to the electronic voting device is enabled; and thermally obfuscating at least a portion of the encoded data printed on the first side of the paper ticket to void the paper ticket and prevent the paper ticket from being reused.

16. The method of claim 15, wherein the paper ticket comprises thermal paper, and wherein said thermally obfuscating the encoded data comprises:

generating a thermal mark over at least a portion of the encoded data, wherein the thermal mark includes a word, a letter, a shape or a symbol.

17. The method of claim 15, wherein the paper ticket comprises thermal paper, wherein the electronic voting device comprises a thermal heating element positioned adjacent to the paper ticket, and wherein said thermally obfuscating the encoded data comprises:

supplying current to the thermal heating element to generate an amount of heat that is sufficient to activate the thermal paper and thermally obfuscate the encoded data printed on the first side of the paper ticket.

18. The method of claim 15, wherein during said attempting to validate the paper ticket, the method comprises:

generating a digital value corresponding to an amount of the illumination that is reflected from the paper ticket;

validating the paper ticket if the digital value falls within a range of digital values corresponding to thermal paper; and invalidating the paper ticket if the digital value does not fall within the range of digital values corresponding to thermal paper.

19. The method of claim 15, wherein said providing illumination comprises providing ultra-violet (UV) illumination or infrared (IR) illumination to the paper ticket, and wherein during said attempting to validate the paper ticket, the method comprises:

obtaining an image of the first side of the paper ticket, wherein the image is captured while the paper ticket is illuminated with the UV illumination or the IR illumination;

analyzing the image to determine the presence or absence of an invisible ink marking on the paper ticket;

validating the paper ticket if the invisible ink marking is detected on the paper ticket; and invalidating the paper ticket if the invisible ink marking is not detected on the paper ticket.

20. The method of claim 15, wherein during said attempting to validate the paper ticket, the method comprises:

obtaining a first image of the first side of the paper ticket;

activating a thermal heating element positioned adjacent to a second side of the paper ticket to attempt to thermally mark the paper ticket;

obtaining a second image of the first side of the paper ticket;

comparing the second image to the first image;

validating the paper ticket if the comparison shows a thermal mark is produced on the paper ticket by the thermal heating element; and invalidating the paper ticket if the comparison shows a thermal mark is not produced on the paper ticket by the thermal heating element.

* * * * *